US011813908B2

(12) United States Patent
Gentner

(10) Patent No.: US 11,813,908 B2
(45) Date of Patent: Nov. 14, 2023

(54) TRAILER HITCH

(71) Applicant: ACPS Automotive GmbH, Ingersheim (DE)

(72) Inventor: Wolfgang Gentner, Steinheim (DE)

(73) Assignee: ACPS Automotive GmbH, Ingersheim (DE)

( * ) Notice: Subject to any disclaimer, the term of this patent is extended or adjusted under 35 U.S.C. 154(b) by 214 days.

(21) Appl. No.: 17/238,534

(22) Filed: Apr. 23, 2021

(65) Prior Publication Data

US 2021/0331540 A1 Oct. 28, 2021

(30) Foreign Application Priority Data

Apr. 27, 2020 (DE) .......................... 102020111468.0

(51) Int. Cl.
*B60D 1/54* (2006.01)
*B60D 1/06* (2006.01)

(52) U.S. Cl.
CPC ................. *B60D 1/54* (2013.01); *B60D 1/06* (2013.01); *B60D 2001/544* (2013.01)

(58) Field of Classification Search
CPC .................................. B60D 1/54; B60D 1/246
See application file for complete search history.

(56) References Cited

U.S. PATENT DOCUMENTS

| 7,699,335 | B2 * | 4/2010 | Riehle | .................... | B60D 1/246 |
|           |      |        |        |                      | 280/491.1  |
| 10,189,323 | B2 * | 1/2019 | Kadnikov | ................ | B60D 1/54 |

(Continued)

FOREIGN PATENT DOCUMENTS

| DE | 102005032474 A1 * | 1/2007 | .............. B60D 1/26 |
| DE | 102005032474 A1 | 1/2007 | |

(Continued)

*Primary Examiner* — Kevin Hurley
(74) *Attorney, Agent, or Firm* — Reinhart Boerner Van Deuren P.C.

(57) ABSTRACT

In order to improve a trailer hitch, comprising a ball neck, which is movable between a working position and a rest position and has a pivot bearing body arranged at a first end and a coupling ball arranged at a second end, a pivot bearing unit, which is arranged fixed to a vehicle and by means of which the pivot bearing body is received such that it is pivotal for the purpose of performing a pivotal movement about a pivot axis between the working position and the rest position, and a rotation-blocking device that is active between the pivot bearing unit and the pivot bearing body, it is proposed that there run between the working position receptacles and the rest position receptacles of the rotation-blocking device blocking faces against which rotation-blocking bodies of the rotation-blocking device are configured to abut, that rotation-blocking units of the rotation-blocking device and the working position receptacles and the rest position receptacles are arranged at angular spacings from one another around the pivot axis such that, in all the pivotal positions of the pivot bearing body that are provided, with the exception of the working position and the rest position, the rotation-blocking body of at least one of the rotation-blocking units lies opposite one of the blocking faces, and thus this blocking face blocks movement of the actuation body in the actuation direction.

41 Claims, 26 Drawing Sheets

(56) References Cited

U.S. PATENT DOCUMENTS

| | | | |
|---|---|---|---|
| 10,780,753 B2 * | 9/2020 | Recker | B60D 1/06 |
| 2007/0007749 A1 * | 1/2007 | Gentner | B60D 1/26 280/491.1 |
| 2017/0072753 A1 | 3/2017 | Kadnikov et al. | |
| 2018/0222265 A1 * | 8/2018 | Recker | B60D 1/54 |
| 2021/0129609 A1 * | 5/2021 | Gentner | B60D 1/54 |
| 2021/0331538 A1 * | 10/2021 | Kato | B60D 1/54 |
| 2021/0331539 A1 | 10/2021 | Gentner | |
| 2021/0331540 A1 * | 10/2021 | Gentner | B60D 1/54 |
| 2021/0354520 A1 * | 11/2021 | Angermann | B60D 1/54 |

FOREIGN PATENT DOCUMENTS

| | | | | |
|---|---|---|---|---|
| DE | 102013007114 A1 | | 10/2014 | |
| DE | 102014011348 A1 | | 2/2015 | |
| DE | 102015115357 A1 | | 3/2017 | |
| DE | 102017102505 A1 | * | 8/2018 | B60D 1/06 |
| DE | 102017102505 A1 | | 8/2018 | |
| DE | 102018124518 A1 | * | 4/2020 | B60D 1/06 |
| DE | 102018124518 A1 | | 4/2020 | |
| WO | WO 2020/069936 A2 | | 4/2020 | |
| WO | WO-2020069936 A3 | * | 5/2020 | B60D 1/06 |

* cited by examiner

FIG.20
FIG.20a
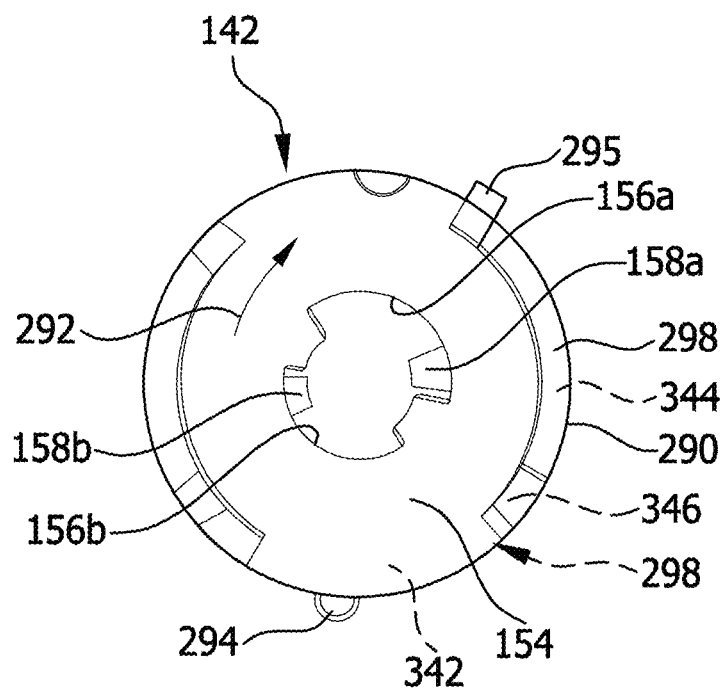
FIG.20b
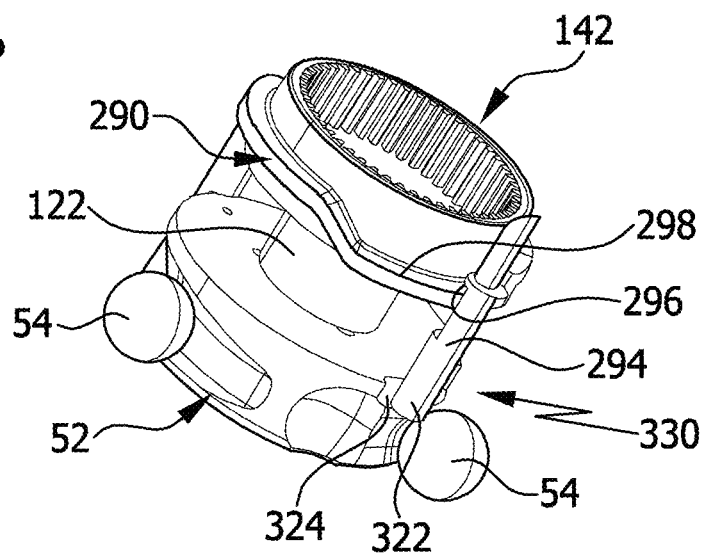

FIG.21
FIG.21a
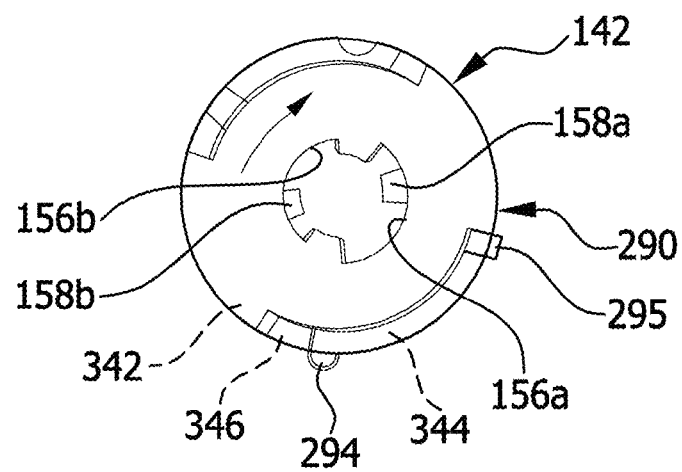
FIG.21b
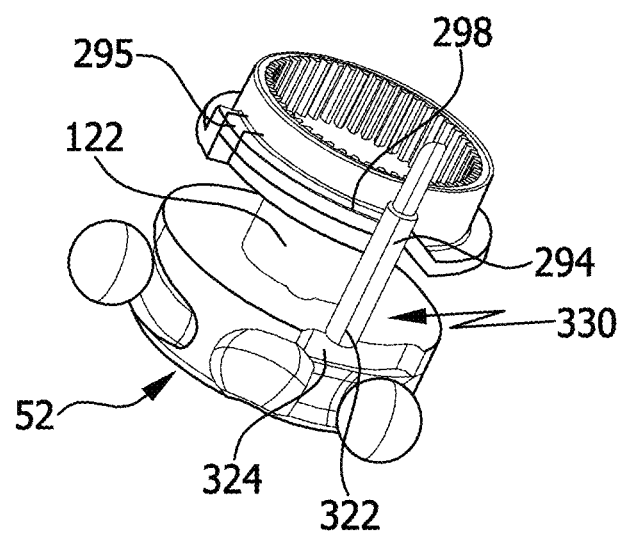

FIG.22
FIG.22a
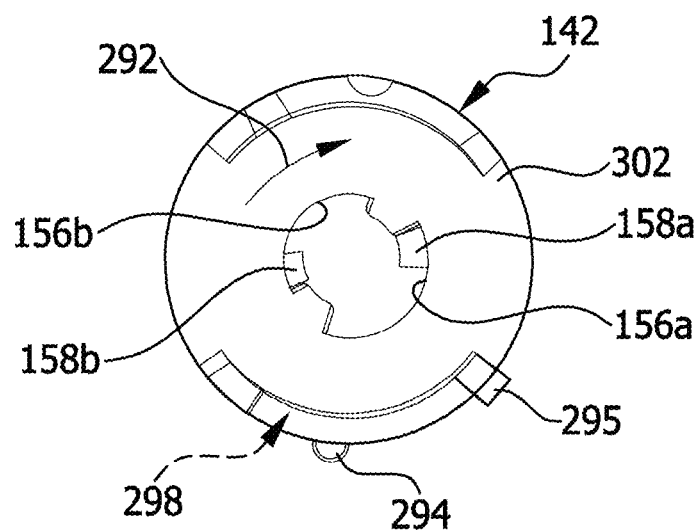
FIG.22b
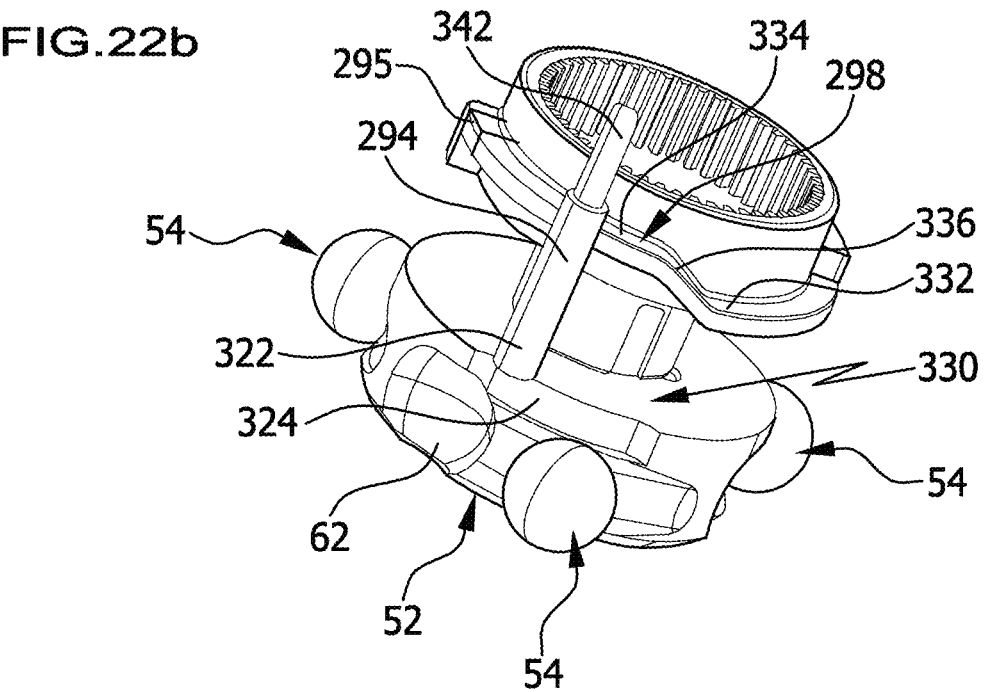

FIG.23
FIG.23a
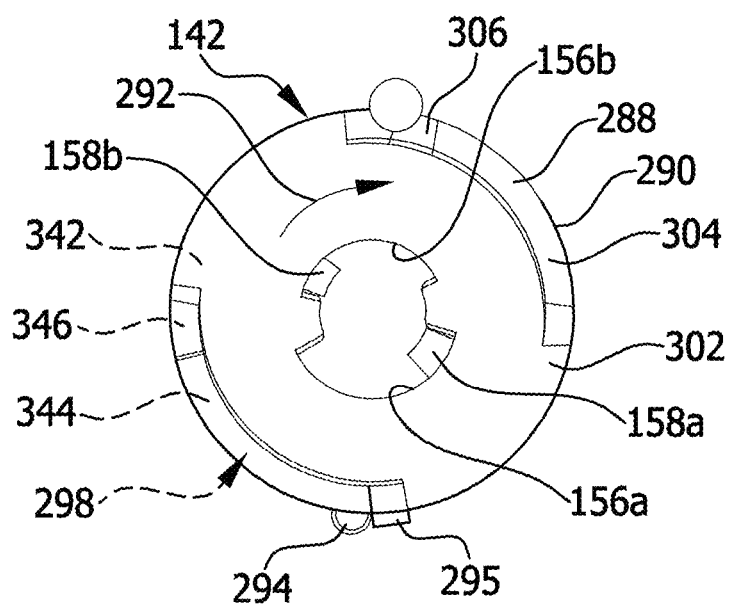
FIG.23b
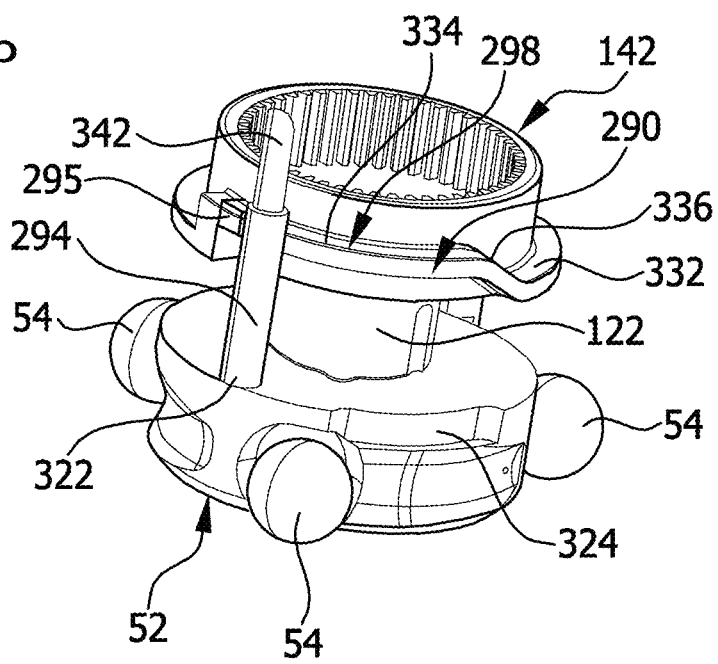

FIG.24
FIG.24a
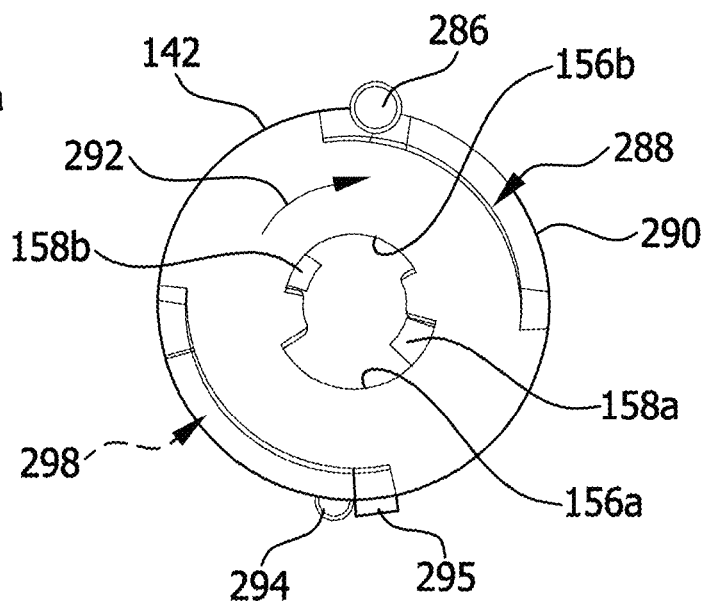
FIG.24b
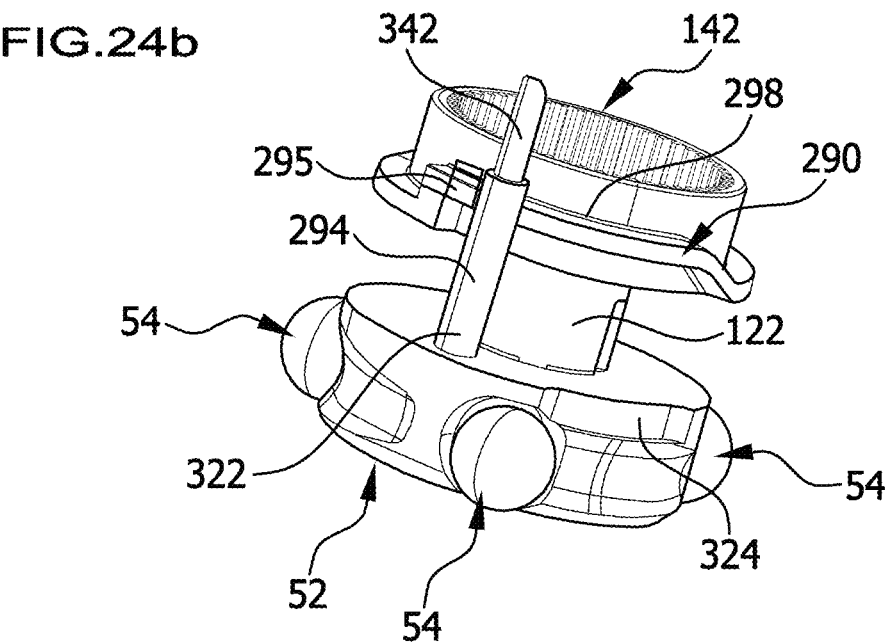

FIG.25
FIG.25a
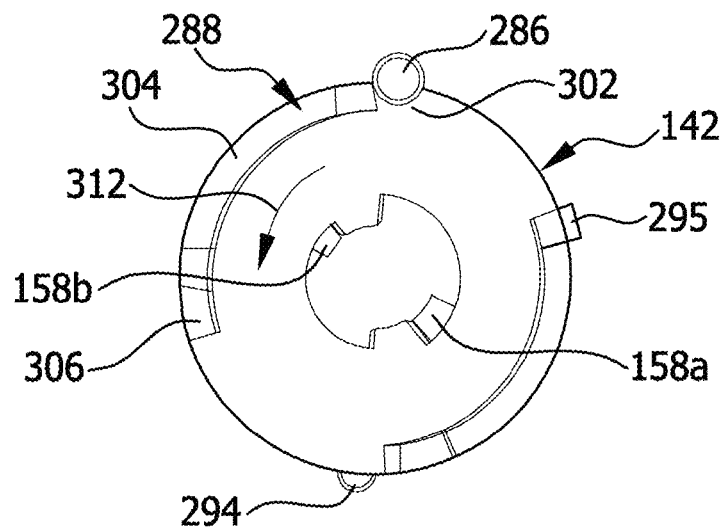
FIG.25b
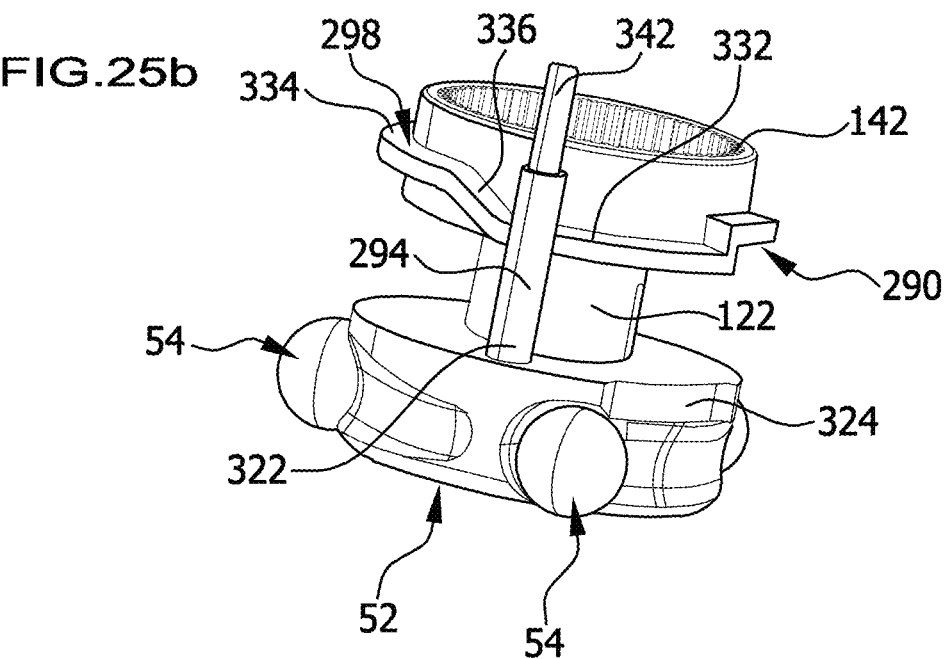

FIG.26
FIG.26a
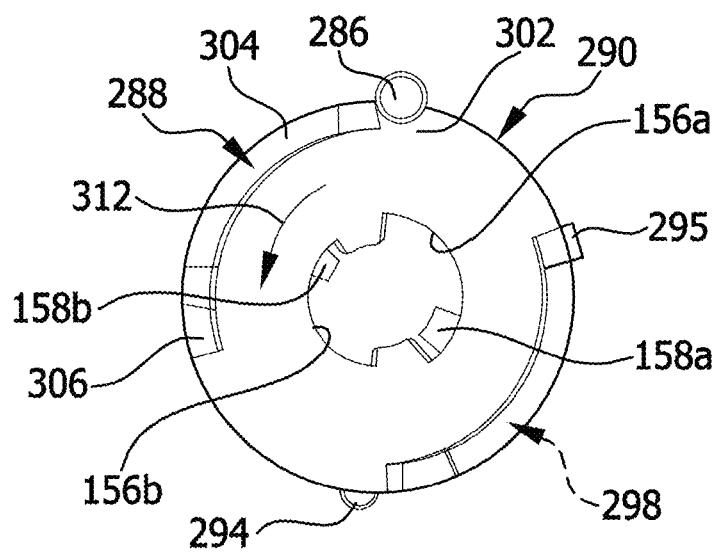
FIG.26b
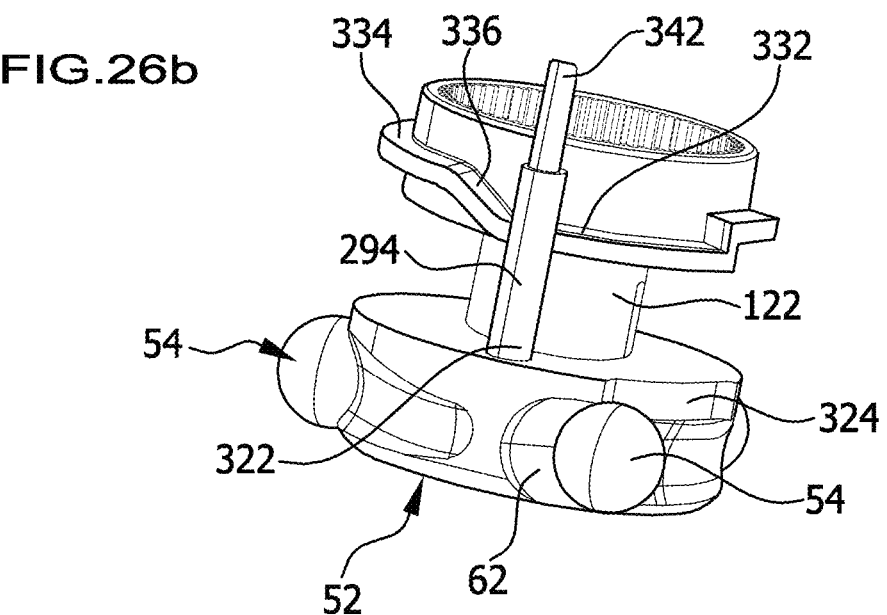

TRAILER HITCH

CROSS-REFERENCE TO RELATED PATENT APPLICATION

This patent application claims the benefit of German application No. 10 2020 111 468.0, filed Apr. 27, 2020, the teachings and disclosure of which are hereby incorporated in their entirety by reference thereto.

BACKGROUND OF THE INVENTION

The invention relates to a trailer hitch, comprising a ball neck, which is movable between a working position and a rest position and has a pivot bearing body arranged at a first end and a coupling ball arranged at a second end, a pivot bearing unit, which is arranged fixed to a vehicle and by means of which the pivot bearing body is received such that it is pivotal for the purpose of performing a pivotal movement about a pivot axis between the working position and the rest position, and a rotation-blocking device that is active between the pivot bearing unit and the pivot bearing body and has on the one hand at least two rotation-blocking units, each of which has a rotation-blocking body that is guided in a manner movable in a guide direction by means of a guide receptacle in a guide body and is movable in the guide direction by a pressure face provided on an actuation body and running transversely to the guide direction, and on the other hand has at least two working position receptacles and at least two rest position receptacles, wherein a movement of the actuation body in an actuation direction makes the rotation-blocking bodies of all the rotation-blocking units movable and urgeable in the guide direction, and wherein, in the working position or the rest position, the rotation-blocking bodies of all the rotation-blocking units are configured to be brought into a rotation-blocking position by movement in the guide direction, and in this position each rotation-blocking body comes into engagement with a respective one of the working position receptacles or the rest position receptacles in order to block a pivotal movement of the pivot bearing body about the pivot axis in relation to the guide body, and wherein the rotation-blocking bodies are configured to be brought into a release position, and in this position are disengaged from the respective working position receptacle or the respective rest position receptacle and enable the pivotal movement of the pivot bearing body.

Trailer hitches of this kind are known from the prior art.

In these, the actuation body is fixed in its release position by means of a latching device provided for this purpose.

On the one hand, this solution is expensive and complex, and in some cases it is also susceptible to faults.

SUMMARY OF THE INVENTION

The object of the invention is therefore to achieve fixing of the rotation-blocking device in the release position in the simplest possible manner.

According to the invention, this object is achieved with a trailer hitch of the type mentioned in the introduction in that there run between the working position receptacles and the rest position receptacles blocking faces against which the rotation-blocking bodies are configured to abut and from which the working position receptacles and the rest position receptacles extend, in that the rotation-blocking units and the working position receptacles and the rest position receptacles are arranged at angular spacings from one another around the pivot axis such that, in all the pivotal positions of the pivot bearing body that are provided, with the exception of the working position and the rest position, the rotation-blocking body of at least one of the rotation-blocking units lies opposite one of the blocking faces, and thus, in particular if there is a force urging the actuation body, this blocking face blocks movement of the actuation body in the actuation direction and consequently also blocks engagement, urged by force, of the rotation-blocking bodies of each of the rotation-blocking units in a respective one of the working position receptacles or rest position receptacles.

The advantage of the solution according to the invention can thus be seen in the fact that the actuation body can be fixed in the release position in a simple and reliable manner by means of the rotation-blocking bodies, which are present in any case, and that moreover there is a significant reduction in noise as this trailer hitch is transferred from the release position into the rotation-blocking position of the rotation-blocking bodies, since the rotation-blocking bodies can slide from the blocking faces into the receptacles in a simple manner.

Further, the solution according to the invention is achieved with a trailer hitch of the type mentioned in the introduction in a manner that is an alternative or addition to the solution described above, in that the rotation-blocking units for forming a rotation-blocking configuration are arranged at angular spacings around the pivot axis, in that the working position receptacles and the rest position receptacles for forming a respective receptacle configuration for the working position and the rest position are arranged at the same angular spacings around the pivot axis as the rotation-blocking units, in that the rotation-blocking configuration and the receptacle configuration of the working position receptacles in the working position and rest position receptacles in the rest position are mutually congruent such that the rotation-blocking bodies can engage in the working position receptacles or the rest position receptacles, and in that the angular spacings between the rotation-blocking units of the rotation-blocking configuration and the angular spacings between the working position receptacles and the rest position receptacles of the receptacle configurations are selected such that the rotation-blocking configuration and the receptacle configurations are only mutually congruent in the working position or the rest position and thus only in these positions allow the actuation body to be transferred from the release position into the rotation-blocking position, whereas in the other pivotal positions of the pivot bearing body it is not possible for the actuation body to be transferred from the release position into the rotation-blocking position.

As an alternative or in addition to the inventive solutions described above, a further advantageous solution provides for the angular spacings of at least one of the rotation-blocking units in relation to the rotation-blocking units arranged in a direction of revolution around the pivot axis and in relation to the rotation-blocking units arranged adjacent and in opposition to this direction of revolution to be dissimilar, and in the working position for the working position receptacles to be arranged such that the rotation-blocking bodies of each of the rotation-blocking units are configured to be brought into engagement with a respective one of the working position receptacles, in the rest position for the rest position receptacles to be arranged such that the rotation-blocking body of each of the rotation-blocking units Is configured to be brought into engagement with a respective one of the rest position receptacles, and, in all the pivotal positions of the pivot bearing body that are provided for operation and are outside the working position and the rest position, for the rotation-blocking body of at least one of the rotation-blocking units to lie opposite a blocking face located between the working position receptacles and the rest position receptacles, and, in particular if there is a force acting on the actuation body, for the blocking face to block movement of the actuation body from the release position into the rotation-blocking position.

The dissimilarity of the angular spacings comprises, by comparison with similar angular spacings, for example at least one deviation from similar angular spacings that is in the order of magnitude of half the angular range spanned by each of the receptacles, preferably up to the angular range spanned by each of the receptacles.

The advantage of all the inventive solutions mentioned above can be seen in the fact that a structurally simple solution is provided to keep the actuation body in the release position and only in the working position to allow it to be transferred into the rotation-blocking position, wherein particularly advantageously the rotation-blocking bodies that are in any case present for the rotation-blocking device can be used.

In the context of the inventive solution, it has proved particularly advantageous if the number of rotation-blocking units corresponds to the number of working position receptacles and the number of rest position receptacles.

Further, in order to obtain a solution that is of spatially compact construction, in particular in the direction of the pivot axis, it is advantageous if the rotation-blocking bodies of all the rotation-blocking units take a form and are arranged such that they are symmetrical in relation to a geometric plane that runs perpendicular to the pivot axis and intersects it.

A particularly advantageous solution provides for the blocking faces to run facing the rotation-blocking bodies of the rotation-blocking units, in particular transversely, preferably perpendicular, to the guide direction, such that when the rotation-blocking bodies abut against the blocking faces, they are movable over them with little or virtually no resistance to movement.

It is particularly advantageous if the blocking faces run around the pivot axis at a defined radius such that during the pivotal movement the rotation-blocking bodies abutting against these blocking faces do not perform any additional radial movement in relation to the pivot axis.

Further, it is advantageously provided for the blocking faces to run as far as opening edges of the working position receptacles and the rest position receptacles and to merge into these.

In particular, it is preferably provided for the opening edges of the working position receptacles and the rest position receptacles to be located at the same radial spacing from the pivot axis as the blocking faces, with the result that it is possible for the rotation-blocking bodies abutting against the blocking faces to perform a movement beyond the opening edges and into the receptacles without any additional resistance to movement—as would occur for example if the spacings of the opening edges from the pivot axis differed from the spacing of the blocking faces from the pivot axis.

In particular, this solution also has the advantage that it produces a simple transfer, free of any resistance to movement, of the pivot bearing body from the working position into a pivotal position, since in this case too the rotation-blocking bodies can come out of the working position receptacles and the rest position receptacles by way of the opening edges, substantially without any resistance to movement, and move in the direction of the blocking faces.

It is particularly advantageous if, in the event of a pivotal movement of the pivot bearing body in the direction of the working position, in particular during the pivotal movement from the rest position to the working position, at least one of the rotation-blocking bodies of the rotation-blocking units abuts against one of the blocking faces, in particular abutting in a manner urged by force by the action of the actuation body, wherein the urging by force is performed for example by retraction receptacles in the actuation body that are provided for the release position of the rotation-blocking bodies and act on the rotation-blocking bodies by means of faces running transversely to the guide direction.

In particular, it is favorable if, before reaching the working position, the rotation-blocking bodies abut against the blocking faces in a manner urged by force and then enter the receptacles such that they abut against opening edges of the receptacles in a manner urged by force, with the result that this can keep the noise developed during transfer of the rotation-blocking bodies from the release position into the rotation-blocking position as low as possible—in contrast to a situation in which the rotation-blocking bodies first abut with play against the blocking faces, are then brought into abutment against the blocking faces in a manner urged by force, and then enter the working position receptacles from the blocking faces, or the situation in which the rotation-blocking bodies, with play in relation to the blocking faces, move into the working position and are urged by force in the working position in order to enter the working position receptacles.

As regards the form taken by the working position receptacles, it is particularly advantageous if the working position receptacles extend in the guide direction from the blocking faces, in particular with at least one component in the radial direction relative to the pivot axis, such that during movement in the guide direction the rotation-blocking bodies do not undergo any additional deflection as they enter the working position receptacles.

It is particularly advantageous if, in the event of a pivotal movement of the pivot bearing body in the direction of the rest position, in particular during the pivotal movement from the working position to the rest position, at least one of the rotation-blocking bodies of the rotation-blocking units abuts against one of the blocking faces, in particular abutting in a manner urged by force by the action of the actuation body, wherein the urging by force is performed for example by retraction receptacles in the actuation body that are provided for the release position of the rotation-blocking bodies and act on the rotation-blocking bodies by means of faces running transversely to the guide direction.

In particular, it is favorable if, before reaching the rest position, the rotation-blocking bodies abut against the blocking faces in a manner urged by force and then enter the rest position receptacles such that they abut against opening edges of the rest position receptacles in a manner urged by force, with the result that this can keep the noise developed during transfer of the rotation-blocking bodies from the release position into the rotation-blocking position as low as possible—in contrast to a situation in which the rotation-blocking bodies first abut with play against the blocking faces, are then brought into abutment against the blocking faces in a manner urged by force, and then enter the rest position receptacles from the blocking faces, or the situation in which the rotation-blocking bodies, with play in relation to the blocking faces, move into the working position and are urged by force in the working position in order to enter the rest position receptacles.

As regards the form taken by the rest position receptacles, it is particularly advantageous if the rest position receptacles extend in the guide direction from the blocking faces, in particular with at least one component in the radial direction relative to the pivot axis, such that during movement in the guide direction the rotation-blocking bodies do not undergo any additional deflection as they enter the rest position receptacles.

Further, more detailed statements have not been made as regards the orientation of the working position receptacles and the rest position receptacles and the blocking faces in relation to the guide sleeve.

For example, an advantageous solution provides for the working position receptacles and the rest position receptacles and the blocking faces to be arranged facing the guide sleeve, with the result that deflection-free movement of the rotation-blocking bodies can be performed in the direction of the blocking faces or in the direction of the working position receptacles and the rest position receptacles.

In principle, the guide body could be pivotal about the pivot axis jointly with the pivot bearing body.

However, a solution that is structurally particularly favorable provides for the guide body to be part of the pivot bearing unit arranged fixed to the vehicle.

Further, as regards the form taken by the guide body, it is provided for all the guide receptacles for the rotation-blocking bodies of the rotation-blocking units to be arranged in the guide body.

Moreover, it is favorable if at least one component of the guide direction runs in the radial direction in relation to the pivot axis, with the result that the rotation-blocking bodies are moved by at least one component in the radial direction in relation to the pivot axis between the rotation-blocking position and the release position, and thus there is not exclusively movement of the rotation-blocking bodies in the direction of the pivot axis in order to move them between the rotation-blocking position and the release position.

A solution that is structurally particularly favorable provides for the guide body to have a guide sleeve with guide receptacles for the rotation-blocking bodies of the rotation-blocking units, and for in particular the rotation-blocking bodies to be guided by the guide body adjoining the pivot bearing body in the radial direction.

More details have not been given, in the context of explaining the exemplary embodiments above, of how the pivot bearing body is to be mounted such that it is pivotal on the pivot bearing unit.

For this purpose, a bearing provided for this could for example be provided on the pivot bearing unit and be independent of the guide body.

However, it is particularly simple from a structural point of view if the guide body has a pivot bearing for the pivot bearing body—that is to say either carries a pivot bearing for the pivot bearing body or itself forms a pivot bearing for the pivot bearing body, by means of an outer face.

More detailed statements have likewise not been made as regards the movement of the actuation bodies in relation to the guide body.

For example, an advantageous solution provides for the actuation body to be guided such that it is movable in relation to the guide body.

Here, the actuation body could be movable relative to the guide body between the rotation-blocking position and the release position, in the direction of the pivot axis, in order to move the rotation-blocking bodies in the corresponding positions.

A solution that has been particularly optimized in respect of space requirements provides for the actuation body to be arranged such that it is rotatable about the pivot axis and in particular to have wedge faces extending over an angular range around the pivot axis and varying in the direction parallel to the guide direction, preferably combined with retraction receptacles.

Moreover, more detailed statements have likewise not been made as regards the arrangement of the receptacles and the blocking faces.

For example, an advantageous solution provides for the receptacles and the blocking faces to be arranged on the pivot bearing body.

Furthermore, a structural solution is particularly favorable as regards absorption of the forces acting there if the actuation body is surrounded by the guide body, and if in particular the pivot bearing body embraces the guide body.

More detailed statements have likewise not been made as regards the arrangement of the rotation-blocking bodies in relation to the actuation body.

In principle, the rotation-blocking bodies could be arranged such that they are embraced by the actuation body.

For the spatial layout of the trailer hitch according to the invention, it has likewise proved advantageous if the rotation-blocking bodies are arranged around the actuation body.

It has proved particularly advantageous from a structural point of view if the pivot bearing body forms an outer body outwardly surrounding the pivot bearing unit, wherein the outer body is arranged to be non-displaceable in the direction of the pivot axis in relation to the pivot bearing unit, and if in particular the pivot bearing body forms an outer body that outwardly surrounds at least one section of the rotation-blocking unit and that is arranged to be non-displaceable in the direction of the pivot axis in relation to the guide body, with the result that when the rotation-blocking bodies are transferred from the rotation-blocking position to the release position and vice versa the pivot bearing body does not perform a movement in the direction of the pivot axis but can be arranged to be non-displaceable in the direction of the pivot axis.

An arrangement of the pivot bearing body of this kind on the one hand has the advantage of a favorable spatial layout of the pivot bearing unit itself and has the advantage of relatively simple sealing of the pivot bearing unit, since the pivot bearing body does not perform any movements in the axial direction of the pivot axis.

Preferably, there is provided between a housing of the pivot bearing unit and at least one end face of the outer body a seal that runs peripherally around the pivot axis and that provides sealing against the penetration of dirt and moisture.

With a solution of this kind, the pivot bearing body at the same time forms the outer body that surrounds and protects the pivot bearing unit, and because the outer body is arranged to be non-displaceable in the direction of the pivot axis in relation to the pivot bearing unit, the effect is in particular that simple sealing between the outer body and the pivot bearing unit is producible.

Particularly favorable from a structural point of view is a solution in which the pivot bearing body forms at least one outer body that outwardly surrounds a section of the rotation-blocking device and that is arranged to be non-displaceable in the direction of the pivot axis in relation to the guide body.

In particular, it is provided for the rotation-blocking bodies to be movable from the release position to the rotation-blocking position by the actuation body.

Preferably in this case, the actuation body takes a form such that, in the release position, it allows the release position of the rotation-blocking bodies.

In particular, a further embodiment of the rotation-blocking body provides, in the rotation-blocking position, for it to keep the rotation-blocking bodies in their rotation-blocking position.

In order to ensure that the rotation-blocking bodies are always transferred to their rotation-blocking position, in particular when there is no active actuation of the actuation body, it is preferably provided for the actuation body to be urged in the direction of its rotation-blocking position by a resilient energy store.

So that the actuation body can be moved from the rotation-blocking position into the release position, it is preferably provided for the actuation body to be movable from the rotation-blocking position into the release position by an actuation device.

In particular, movement of this kind, of the actuation body by the actuation device, is performed in opposition to urging by the energy store—that is to say that the actuation device counters urging by the energy store and thus has to overcome the forces exerted by the energy store.

In particular in the case of a rotary actuation body, it is preferably provided that, as a result of the actuation device, the actuation body is rotated in opposition to the direction of rotation brought about by the resilient energy store.

A resilient energy store of this kind may in principle be arranged in a plurality of locations.

It is particularly favorable from a structural point of view if the resilient energy store is arranged within the pivot bearing unit.

A further structurally favorable solution provides for the resilient energy store to be arranged on a side of the actuation body.

In this case, the resilient energy store can advantageously be coupled to the actuation element.

As regards action on the actuation body, the most diverse solutions are conceivable.

For example, an advantageous solution provides for the actuation device to have an output element that is coupled to the actuation body.

In principle, it would be possible to couple the output element and the actuation body rigidly to one another.

However, it is particularly favorable if the output element and the actuation body are coupled to one another by way of an entraining coupling device that allows a relative movement about a delimited angle of rotation, depending on the position of the output element and the position of the actuation body, in particular their rotary position.

In this case, the entraining coupling device could be a resilient connection member.

However, it is particularly simple if the entraining coupling device has a free condition, with no entrainment, and an entraining condition—that is to say that either the free condition or the entraining condition prevails.

In the context of the solutions above, the drive of the rotation-blocking device, which makes it possible to transfer the rotation-blocking device from at least one rotation-blocking position into a release position and vice versa, has only been explained in general terms.

Further, it is preferably provided for the actuation device for the rotation-blocking device to comprise a motorized drive unit.

In this case, a motorized drive unit that is associated exclusively with the actuation device for the rotation-blocking device could be provided.

Further, it is preferably provided for the step-down gear to be arranged on a side of the actuation element of the rotation-blocking device that faces the motorized drive.

For a compact layout, it is particularly useful if, as seen in the direction of the pivot axis, the step-down gear is driven on one side by the motorized drive unit and has an output drive for the actuation element on the opposite side.

In this way, preferably the step-down gear is arranged, as seen in the direction of the pivot axis, between the motorized drive unit and the actuation element.

Further, the step-down gear, the resilient energy store and the actuation element are preferably arranged such that they succeed one another in the direction of the pivot axis, in particular within the pivot bearing unit.

In order further to ensure that, despite being urged by the resilient energy store, the actuation body does not come out of its rotation-blocking position, it is preferably provided for the actuation body to be blockable in its rotary position by a securing device.

In particular in this case, it is provided for the actuation body to be blockable by the securing device to prevent its reaching its release position, in order to ensure that the actuation body never of itself allows the release position of the rotation-blocking bodies, for example if there is a rupture in the resilient energy store urging the actuation body in the direction of its active position.

A securing device of this kind takes a form such that it requires action to override blocking of the actuation body.

For this reason, it is favorably provided for the actuation device for the rotation-blocking device to be coupled to the securing device such that release of blocking of the actuation body by the securing device can also be performed by way of the actuation device.

Preferably here, the securing device is coupled to the actuation device such that the securing device blocks a movement of the actuation body not triggered by actuation.

In particular, the securing device takes a form such that, if the actuation device is not actuated, the securing device blocks movement of the actuation body into its release position.

A favorable solution in this case provides for the drive element of the actuation device—for example the output element of the step-down gear—to be coupled to the securing device.

Favorably in this case, the output element—for example the output element of the step-down gear—can take a form such that, by way of the output element, action on the actuation body and action on the securing device are matched to one another such that actuation of the actuation device on the one hand results in blocking of the actuation body being overridden and on the other hand has the result that the actuation body is moved from the active position into the inactive position.

For example, for this purpose it is provided for the output element, in the course of moving from the starting position into an intermediate position, to transfer the securing device from the securing position into the unsecured position.

As regards the coupling between the output element and the securing device, the most diverse possibilities are conceivable.

For example, any type of coupling would be conceivable, for example also coupling by way of an electric control unit.

Here, a solution that is particularly favorable because of its simplicity provides for the output element and the securing device to be coupled to one another by way of a mechanical coupling device.

The mechanical coupling device favorably takes a form such that it controls action on the securing device by means of a cam track.

As regards the form taken by the securing device, the most diverse solutions are conceivable.

The securing device operates particularly reliably if it has a resilient energy store that always urges the securing device in the direction of its position in which the actuation body is secured or blocked in the rotation-blocking position.

Further, it is preferably provided for the securing device to be movable from its securing position into an unsecured position.

Preferably in this case, movement of the securing device into the unsecured position is likewise performed by the output unit for the actuation unit.

In the context of the inventive solution it is provided for energizing of a drive to cause it to act on the actuation body from a starting position, in opposition to the urging thereof by force brought about in particular by a spring element, with the result that the actuation body is moved from the rotation-blocking position into the release position.

As soon as the release position of the rotation-blocking device has been reached, the pivot bearing body comes out of the position—that is to say the working position or the rest position—in which it has been locked such that it cannot rotate, and moves, in particular under the action of the force of gravity, into an intermediate position, wherein as soon as it has come out of the working position or the rest position movement of the actuation body into the rotation-blocking position is blocked by the blocking faces.

After the working position or rest position has been left, the drive is therefore energized such that it moves back into the starting position again, and if the pivot bearing body reaches the working position or the rest position, in particular as a result of manual action, then as a result of being urged by force the actuation body can thus be transferred from the release position into the rotation-blocking position and can lock the pivot bearing body again.

Thus, the description above of inventive solutions comprises in particular the different combinations of features that are defined by the paragraphs below:

An aspect is directed toward a trailer hitch, comprising a ball neck (10), which is movable between a working position (A) and a rest position (R) and has a pivot bearing body (14) arranged at a first end and a coupling ball (18) arranged at a second end, a pivot bearing unit (20), which is arranged fixed to a vehicle and by means of which the pivot bearing body (14) is received such that it is pivotal for the purpose of performing a pivotal movement about a pivot axis (22) between the working position (A) and the rest position (R), and a rotation-blocking device (50) that is active between the pivot bearing unit (20) and the pivot bearing body (14) and has on the one hand at least two rotation-blocking units (80), each of which has a rotation-blocking body (54) that is guided in a manner movable in a guide direction (58) by means of a guide receptacle (56) in a guide body (40) and is movable in the guide direction (58) by a pressure face (66) provided on an actuation body (52) and running transversely to the guide direction (58), and on the other hand has at least two working position receptacles (60A) and at least two rest position receptacles (60R), wherein a movement of the actuation body (52) in an actuation direction (72) makes the rotation-blocking bodies (54) of all the rotation-blocking units (80) movable and urgeable in the guide direction (58), and wherein, in the working position (A) or the rest position (R), the rotation-blocking bodies (54) of all the rotation-blocking units (80) are configured to be brought into a rotation-blocking position by movement in the guide direction (58), and in this position each rotation-blocking body (54) comes into engagement with a respective one of the working position receptacles (60A) or the rest position receptacles (60R) in order to block a pivotal movement of the pivot bearing body (14) about the pivot axis (22) in relation to the guide body (40), and wherein the rotation-blocking bodies (54) are configured to be brought into a release position, and in this position are disengaged from the respective working position receptacle (60A) or the respective rest position receptacle (60R) and enable the pivotal movement of the pivot bearing body (14), wherein there run between the working position receptacles (60A) and the rest position receptacles (60R) blocking faces (90) against which the rotation-blocking bodies (54) are configured to abut and from which the working position receptacles (60A) and the rest position receptacles (60R) extend, wherein the rotation-blocking units (80) and the working position receptacles (60A) and the rest position receptacles (60R) are arranged at angular spacings (W) from one another around the pivot axis (22) such that, in all the pivotal positions of the pivot bearing body (14) that are provided, with the exception of the working position (A) and the rest position (R), the rotation-blocking body (54) of at least one of the rotation-blocking units (80) lies opposite one of the blocking faces (90), and thus, in particular if there is a force urging the actuation body (52) in the direction of the actuation direction (72), this blocking face (90) blocks movement of the actuation body (52) in the actuation direction (72) and consequently also blocks engagement, urged by force, of the rotation-blocking bodies (54) of each of the rotation-blocking units (80) in one of the working position receptacles (60A) or rest position receptacles (60R).

Another feature useable with the above aspect (or that may be its own aspect in a trailer hitch) provides that the rotation-blocking units (80) for forming a rotation-blocking configuration are arranged at angular spacings (W) around the pivot axis (22), wherein the working position receptacles (60A) and the rest position receptacles (60R) for forming a respective receptacle configuration for the working position (A) and the rest position (R) are arranged at the same angular spacings (W) around the pivot axis (22) as the rotation-blocking units (80), in that the rotation-blocking configuration and the receptacle configuration of the working position receptacle (60A) in the working position (A) or the rest position receptacles (60R) in the rest position® are mutually congruent such that the rotation-blocking bodies (54) can engage in the working position receptacles or the rest position receptacles, and wherein the angular spacings (W) between the rotation-blocking units (80) of the rotation-blocking configuration and the angular spacings between the working position receptacles (60A) and the rest position receptacles (60R) of the receptacle configurations are selected such that the rotation-blocking configuration and one of the receptacle configurations are only mutually congruent in the working position (A) or the rest positi®.

Another feature useable with either of the above aspects (or that may be its own aspect in a trailer hitch) provides that the angular spacings (W) of at least one of the rotation-blocking units (80) in relation to the rotation-blocking units (80) arranged in a direction of revolution around the pivot axis (22) and in relation to the rotation-blocking units (80) arranged adjacent and in opposition to this direction of revolution are dissimilar, wherein in the working position (A) the working position receptacles (60A) are arranged such that the rotation-blocking body (54) of each of the rotation-blocking units (80) is configured to be brought into engagement with a respective one of the working position receptacles (60A), wherein in the rest position (R) the rest position receptacles (60R) are arranged such that the rotation-blocking body (54) of each of the rotation-blocking units (80) is configured to be brought into engagement with a respective one of the rest position receptacles (60R), and wherein, in all the pivotal positions of the pivot bearing body (14) that are provided for operation and are outside the working position (A) and the rest position (R), the rotation-blocking body (54) of at least one of the rotation-blocking units (80) lies opposite a blocking face (90) running between the working position receptacles (60A) and the rest position receptacles (60R), and, in particular if there is a force acting on the actuation body (52), the blocking face (90) blocks movement of the actuation body (52) from the release position into the rotation-blocking position.

Any of the above aspects or features may further provide that the blocking faces (90) run facing the rotation-blocking bodies (54) of the rotation-blocking units (80).

Any of the above aspects or features may further provide that the blocking faces (90) run around the pivot axis (22) at a defined radius.

Any of the above aspects or features may further provide that the blocking faces (90) run as far as opening edges (92) of the working position receptacles (60A) and the rest position receptacles (60R) and merge into these.

The immediately above feature may further provide that wherein the opening edges (92) of the working position receptacles (60A) and the rest position receptacles (60R) are located at the same radial spacing from the pivot axis (22) as the blocking faces (90).

Any of the above aspects or features may further provide that in the event of a pivotal movement of the pivot bearing body (14) in the direction of the working position (A), at least one of the rotation-blocking bodies (54) of the rotation-blocking units (80) abuts against one of the blocking faces (90), in particular abutting in a manner urged by force by the action of the actuation body (52).

Any of the above aspects or features may further provide that before reaching the working position (A), the rotation-blocking bodies (54) abut against the blocking faces (90) in a manner urged by force and then enter the working position receptacles (60A) such that they abut against opening edges (92) of the working position receptacles (60A) in a manner urged by force.

Any of the above aspects or features may further provide that the working position receptacles (60A) extend in the guide direction (58) from the blocking faces (90), in particular with at least one component in the radial direction relative to the pivot axis (22).

Any of the above aspects or features may further provide that in the event of a pivotal movement of the pivot bearing body (14) in the direction of the rest position (R), at least one of the rotation-blocking bodies (54) of the rotation-blocking units (80) abuts against one of the blocking faces (90), in particular abutting in a manner urged by force by the action of the actuation body (52).

Any of the above aspects or features may further provide that before reaching the rest position (R), the rotation-blocking bodies (54) abut against the blocking faces (90) in a manner urged by force and then enter the rest position receptacles (60R) such that they abut against opening edges (92) of the rest position receptacles (60R) in a manner urged by force.

Any of the above aspects or features may further provide that the rest position receptacles (60R) extend in the guide direction (58) from the blocking faces (90), in particular with at least one component in the radial direction relative to the pivot axis (22).

Any of the above aspects or features may further provide that the working position receptacles (60A), the rest position receptacles (60R) and the blocking faces (90) are arranged facing the guide sleeve (40).

Any of the above aspects or features may further provide that the guide body (40) is part of the pivot bearing unit (20) arranged fixed to the vehicle.

Any of the above aspects or features may further provide that all the guide receptacles (56) for the rotation-blocking bodies (54) of the rotation-blocking units (80) are arranged in the guide body (40).

Any of the above aspects or features may further provide that at least one component of the guide direction (58) runs in the radial direction in relation to the pivot axis (22).

Any of the above aspects or features may further provide that the guide body (40) has a guide sleeve (44) with guide receptacles (56) for the rotation-blocking bodies (54) of the rotation-blocking units (80), and wherein in particular the rotation-blocking bodies (54) are guided by the guide body (40) adjoining the pivot bearing body (14) in the radial direction.

Any of the above aspects or features may further provide that the guide body (40) has a pivot bearing for the pivot bearing body (14).

Any of the above aspects or features may further provide that the actuation body (52) is guided such that it is movable in relation to the guide body (40).

Any of the above aspects or features may further provide that the actuation body (52) is arranged such that it is rotatable about the pivot axis (22) and in particular has wedge faces (66) extending over an angular range around the pivot axis (22) and varying in the direction parallel to the guide direction (58), preferably combined with retraction receptacles (62).

Any of the above aspects or features may further provide that the receptacles (60) and the blocking faces (90) are arranged on the pivot bearing body (14).

Any of the above aspects or features may further provide that the actuation body (52) is surrounded by the guide body (40), and wherein in particular the pivot bearing body (14) embraces the guide body (40).

Any of the above aspects or features may further provide that the rotation-blocking bodies (54) are arranged around the actuation body (52).

Any of the above aspects or features may further provide that the pivot bearing body (14) forms an outer body outwardly surrounding the pivot bearing unit (20), wherein the outer body is arranged to be non-displaceable in the direction of the pivot axis (22) in relation to the pivot bearing unit (20), and wherein in particular the pivot bearing body (14) forms an outer body that outwardly surrounds at least one section of the rotation-blocking unit (50) and that is arranged to be non-displaceable in the direction of the pivot axis (22) in relation to the guide body (40).

Any of the above aspects or features may further provide that the actuation body (52) is urged in the direction of its rotation-blocking position by a resilient energy store (114).

Any of the above aspects or features may further provide that the actuation body (52) is movable from the rotation-blocking position into the release position by an actuation device (180).

Any of the immediately above two features may further provide that the actuation body (52) is movable by the actuation device (180) in opposition to urging by the energy store (114).

Any of the immediately above three features may further provide that as a result of the actuation device (180), the actuation body (52) is rotatable in opposition to the actuation direction (72) brought about by the resilient energy store (114).

Any of the above aspects or features may further provide that the actuation device (180) has an output element (142) that is coupled to the actuation body (52).

The immediately above feature may further provide that the output element (142) and the actuation body (52) are coupled to one another by way of an entraining coupling device (156, 158).

The immediately above feature may further provide that the entraining coupling device (156, 158) has a free condition, with no entrainment, and an entraining condition.

Any of the above aspects or features may further provide that the actuation device (180) for the rotation-blocking device (50) comprises a motorized drive unit.

Any of the above aspects or features may further provide that an output element (142) of a step-down gear (130) for driving the rotation-blocking device (50) is provided.

The immediately above feature may further provide that the step-down gear (130) is driven by a motorized drive unit (182) and in particular takes the form of an epicyclic gear.

Any of the immediately above two features may further provide the step-down gear (130) is arranged on a side of the actuation element (52) that faces the motorized drive (182).

Any of the immediately above four features may further provide as seen in the direction of the pivot axis (22), the step-down gear (130) is driven on one side of the motorized drive unit (182) and has an output drive (142) for the actuation element (52) on the opposite side.

Any of the immediately above five features may further provide the step-down gear (130) is arranged, as seen in the direction of the pivot axis (22), between the motorized drive unit (182) and the actuation element (52).

Any of the immediately above five features may further provide the step-down gear (130), the resilient energy store (114) and the actuation element (52) are arranged such that they succeed one another in the direction of the pivot axis (22).

Any of the above aspects or features may further provide that the actuation body (52) is blockable in its rotation-blocking position by a securing device (330).

Any of the above aspects or features may further provide that the actuation body (52) is blockable by the securing device (330) to prevent its reaching its release position.

Further features and advantages of the solution according to the invention form the subject matter of the description below and the representation in the drawing of an exemplary embodiment.

BRIEF DESCRIPTION OF THE DRAWINGS

FIG. 20 shows the following in the starting position:

FIG. 20a shows a plan view of the ring gear of the planetary gear, from the drive sleeve side;

FIG. 20b shows a perspective illustration of cooperation of the ring gear in the position of FIG. 20a with a securing device and with the rotation-blocking device;

FIG. 21 shows the following, in the first position of the ring gear as it is rotated in relation to the starting position, for releasing the securing device and without action on the rotation-blocking device:

FIG. 21a shows a plan view of the ring gear of the planetary gear, from the drive sleeve side;

FIG. 21b shows a perspective illustration of cooperation of the ring gear in the position of FIG. 21a with a securing device and with the rotation-blocking device;

FIG. 22 shows the following, in a position of the ring gear that is rotated to the maximum extent in relation to the starting position, without action on the rotation-blocking device:

FIG. 22a shows a plan view of the ring gear of the planetary gear, from the drive sleeve side;

FIG. 22b shows a perspective illustration of cooperation of the ring gear in the position of FIG. 22a with a securing device and with the rotation-blocking device;

FIG. 23 shows the following, in a position of the ring gear as it is rotated in relation to the starting position, on reaching the release position of the rotation-blocking device:

FIG. 23a shows a plan view of the ring gear of the planetary gear, from the drive sleeve side;

FIG. 23b shows a perspective illustration of cooperation of the ring gear in the position of FIG. 23a with a securing device and with the rotation-blocking device;

FIG. 24 shows the following, in a position of the ring gear as it is rotated in relation to the starting position, on reaching the rest position of the pivot bearing body:

FIG. 24a shows a plan view of the ring gear of the planetary gear, from the drive sleeve side;

FIG. 24b shows a perspective illustration of cooperation of the ring gear in the position of FIG. 24a with a securing device and with the rotation-blocking device;

FIG. 25 shows the following, in a position of the ring gear as it is rotated in relation to the starting position, and with deactivation of the rest position latching device:

FIG. 25a shows a plan view of the ring gear of the planetary gear, from the drive sleeve side;

FIG. 25b shows a perspective illustration of cooperation of the ring gear in the position of FIG. 25a with a securing device and with the rotation-blocking device;

FIG. 26 shows the following, in a position of the ring gear as it is rotated in relation to the starting position in FIG. 20, during transfer of the rotation-blocking device into the rotation-blocking position:

FIG. 26a shows a plan view of the ring gear of the planetary gear, from the drive sleeve side; and FIG. 26b shows a perspective illustration of cooperation of the ring gear in the position of FIG. 26a with a securing device and with the rotation-blocking device.

DETAILED DESCRIPTION OF THE INVENTION

Figure 1:
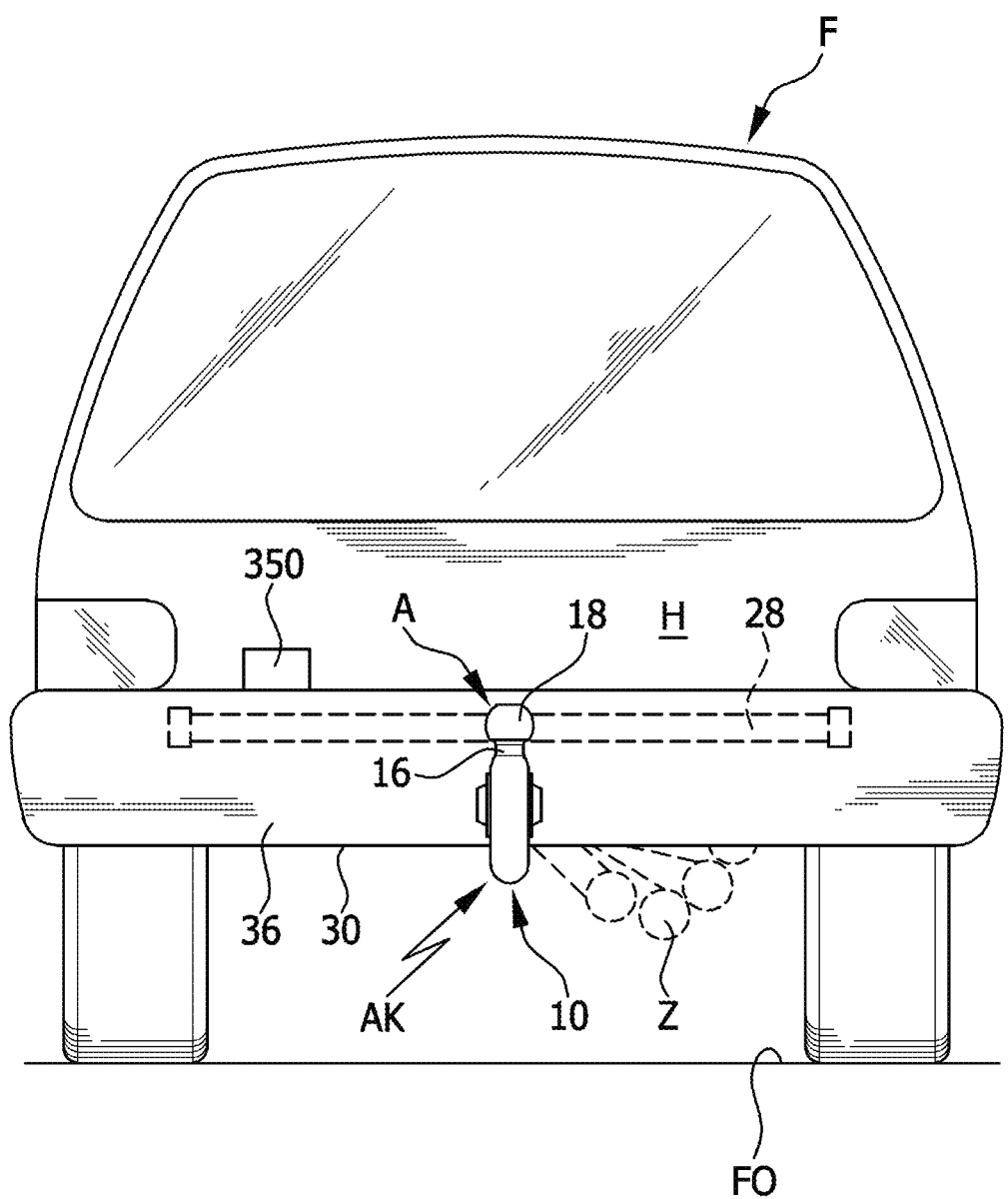
FIG. 1 shows a rear view of a motor vehicle with a trailer hitch according to the invention.
Figure 2:
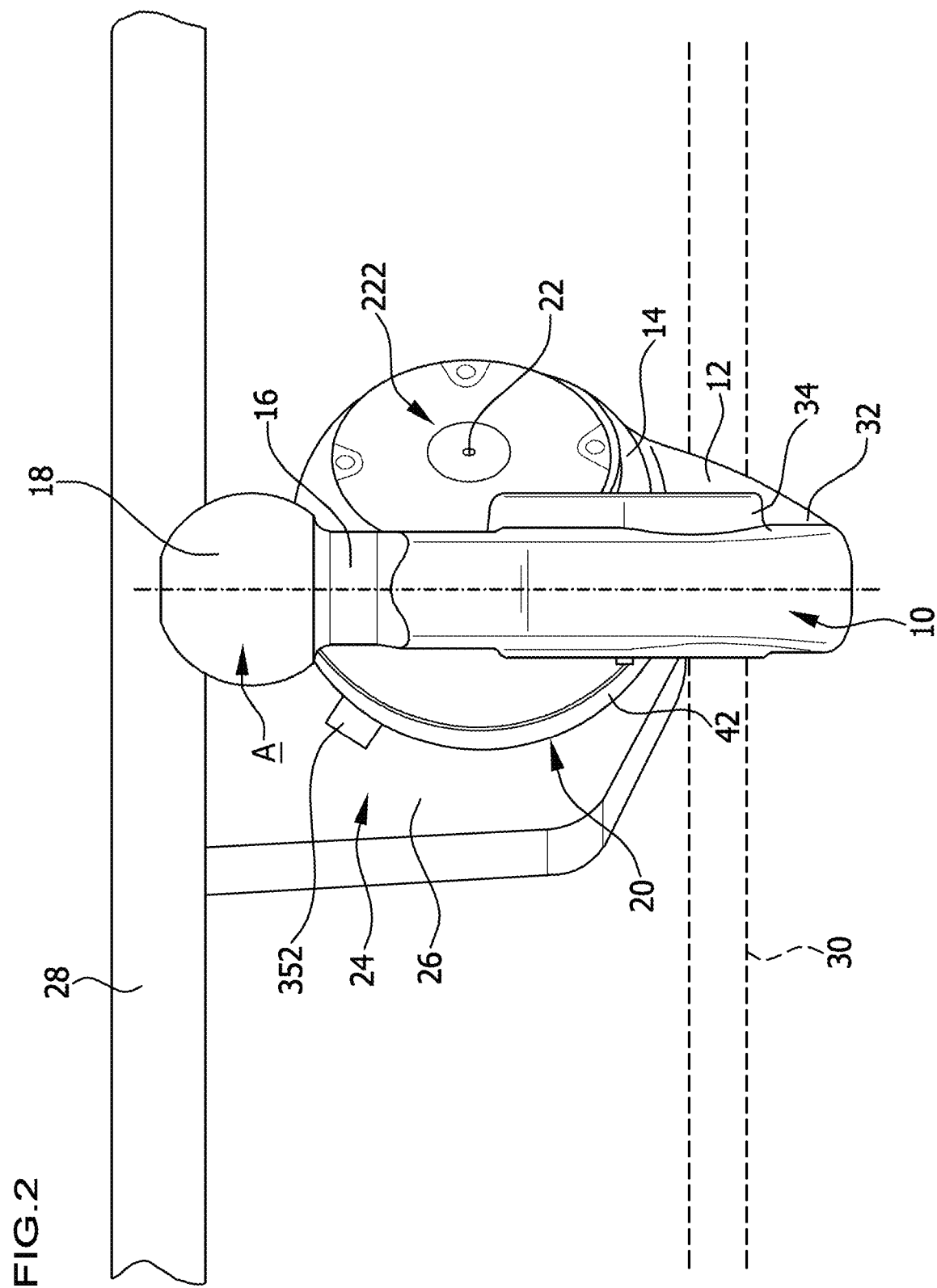
FIG. 2 shows a plan view of a first exemplary embodiment of a trailer hitch according to the invention, with a view in the direction of travel of the trailer hitch mounted on a vehicle rear, wherein the trailer hitch is in its working position.
Figure 3:
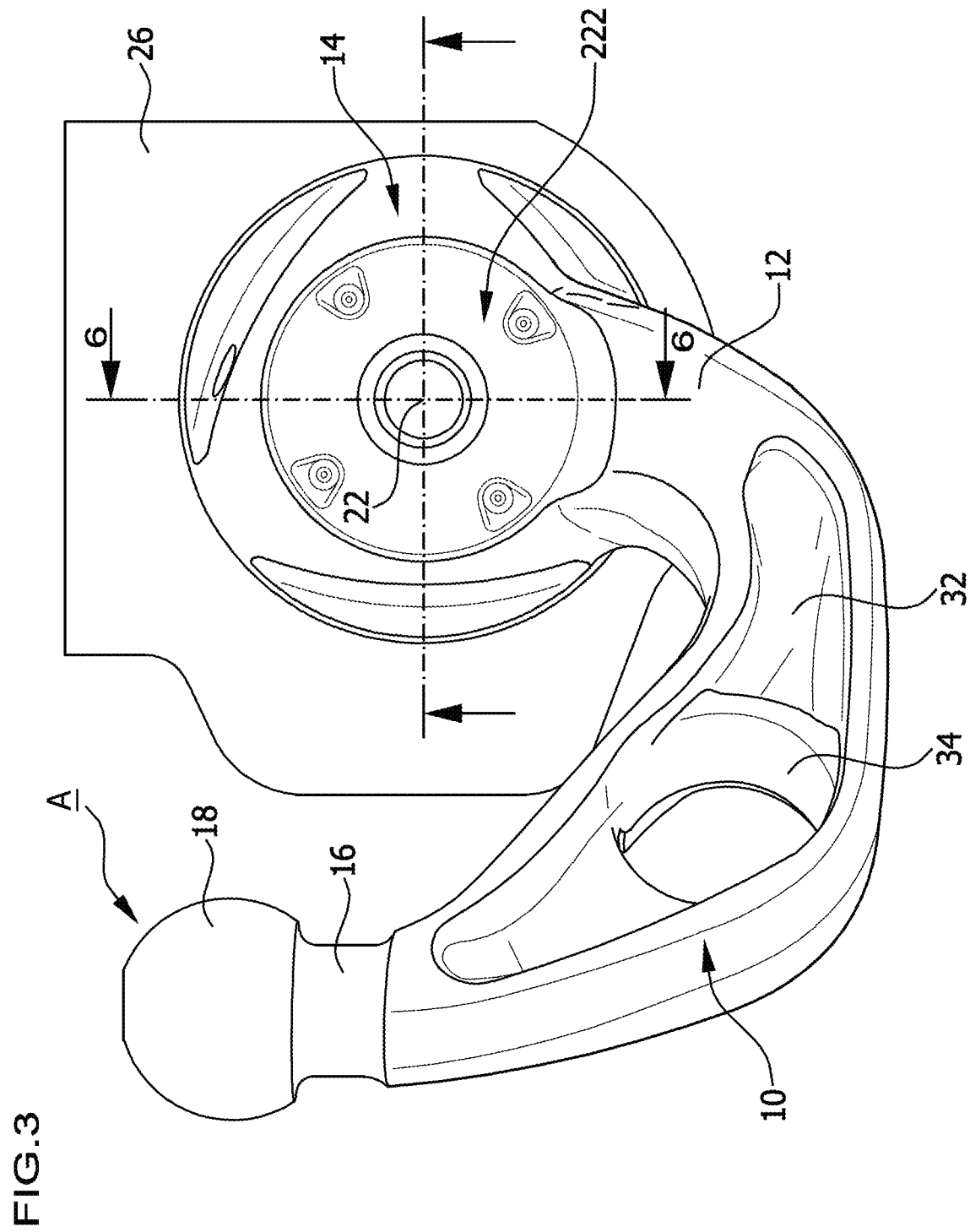
FIG. 3 shows a plan view of the trailer hitch in FIG. 2, in the direction of the pivot axis.
Figure 4:
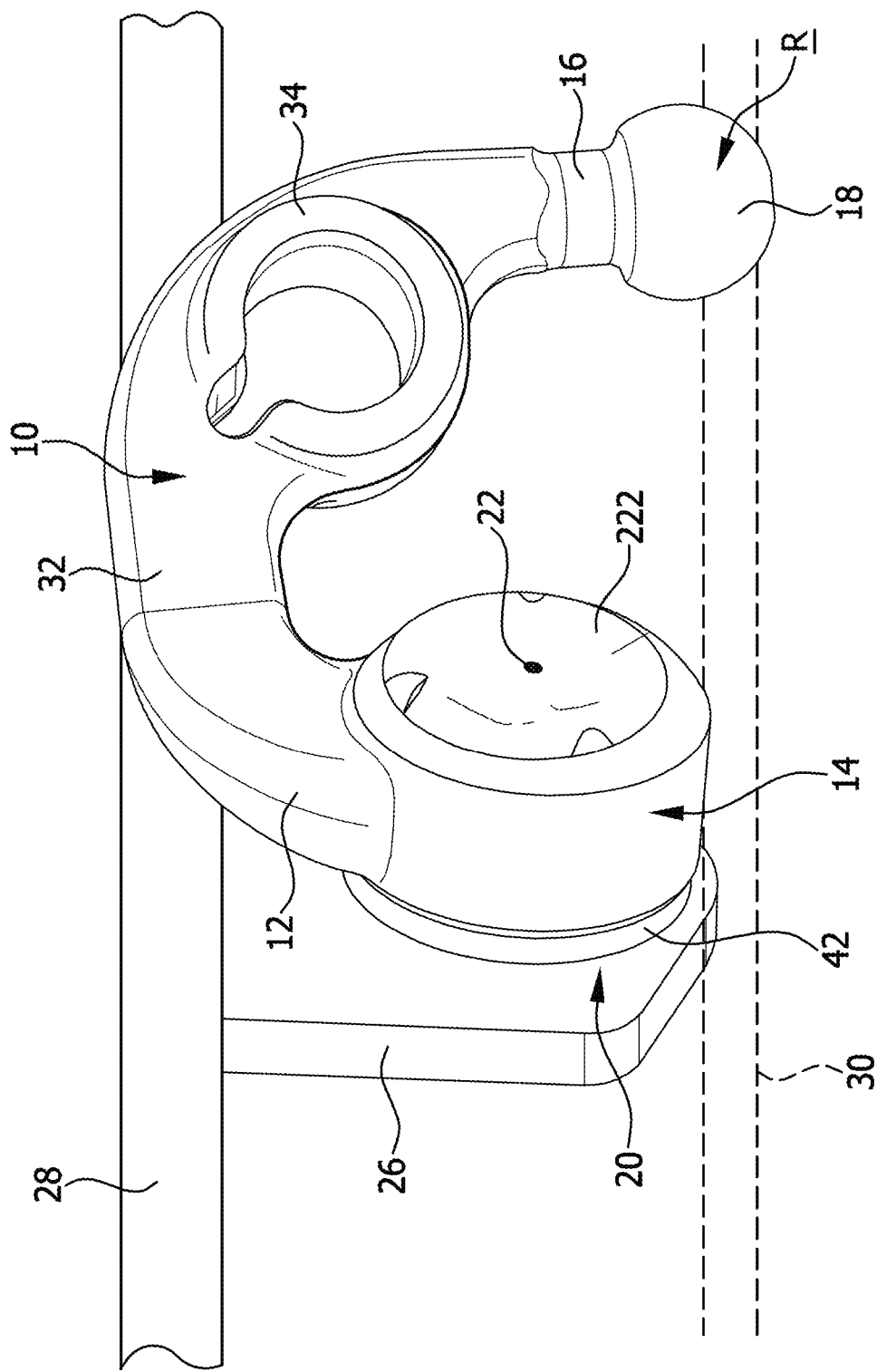
FIG. 4 shows a view corresponding to FIG. 2, of the trailer hitch in the rest position.
Figure 5:
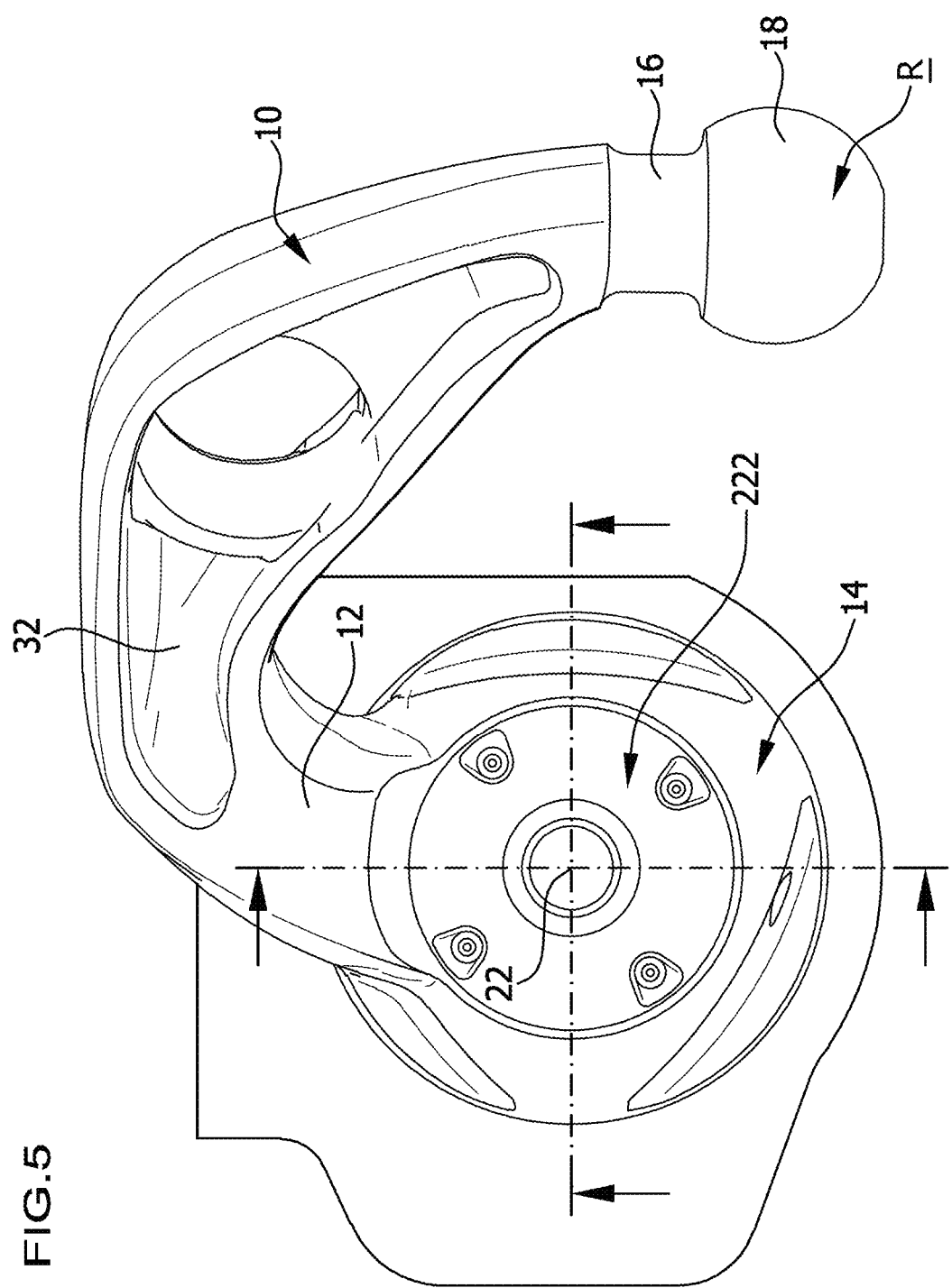
FIG. 5 shows a plan view of the trailer hitch in accordance with the trailer hitch from FIG. 4 in the rest position, in the direction of the pivot axis.

A first exemplary embodiment of a trailer hitch AK according to the invention for a motor vehicle, which is illustrated in a working position A in FIGS. 1, 2 and 3 and in a rest position R in FIGS. 4 and 5, comprises a ball neck, which is designated 10 as a whole, is held at a first end 12 on a pivot bearing body 14, and carries at a second end 16 a coupling ball, designated 18 as a whole, wherein a coupling ball receptacle of a trailer is configured to be fixed on the coupling ball.

The pivot bearing body 14 is mounted such that it is pivotal about a pivot axis 22 in relation to a carrier 24 fixed to the vehicle, by a pivot bearing unit that is designated 20 as a whole, wherein the carrier 24 preferably has a bearing plate 26, which holds the pivot bearing unit 20 and preferably extends in a plane perpendicular to the pivot axis 22, and a transverse carrier 28, which is fixed to the vehicle and is configured to be secured in known manner to a rear region H of a vehicle body F such that the pivot bearing unit 20 and the carrier 24 are located on a side of a lower edge 30 of a bumper unit 36 that is remote from the road surface FO, and are covered by the bumper unit 36 (FIG. 3).

In the working position, which is illustrated in FIGS. 1 and 2, the ball neck 10 engages below the lower edge 30 of the bumper unit 36 by means of a portion 32 adjoining the first end 12, such that the second end 16 and the coupling ball 18, together with a plug socket 34, are located on a side of the rear bumper unit 36 remote from the vehicle body F, whereas in the rest position both the pivot bearing unit 20 and also the entire ball neck 10, together with the coupling ball 18, are covered from view from the back by the rear bumper unit 36.

As illustrated in FIGS. 6 to 9, the pivot bearing unit 20 comprises a guide body 40, which is fixedly connected to the bearing plate 26 by a flange 42, and a guide sleeve 44 that extends away from the bearing plate 26, starting from the flange 42, wherein the pivot bearing body 14 is rotatably mounted on the guide sleeve 44.

For this purpose, the guide sleeve 44 comprises a cylinder outer face 46 against which the pivot bearing body 14 abuts by means of a cylinder inner face 48 and hence undergoes rotary guidance about the axis 22, about the pivot axis 22, with the result that the pivot bearing body 14 is rotatable in relation to the guide body 40 such that the ball neck 10 is pivotal from the working position A into the rest position R and vice versa.

Figure 15:
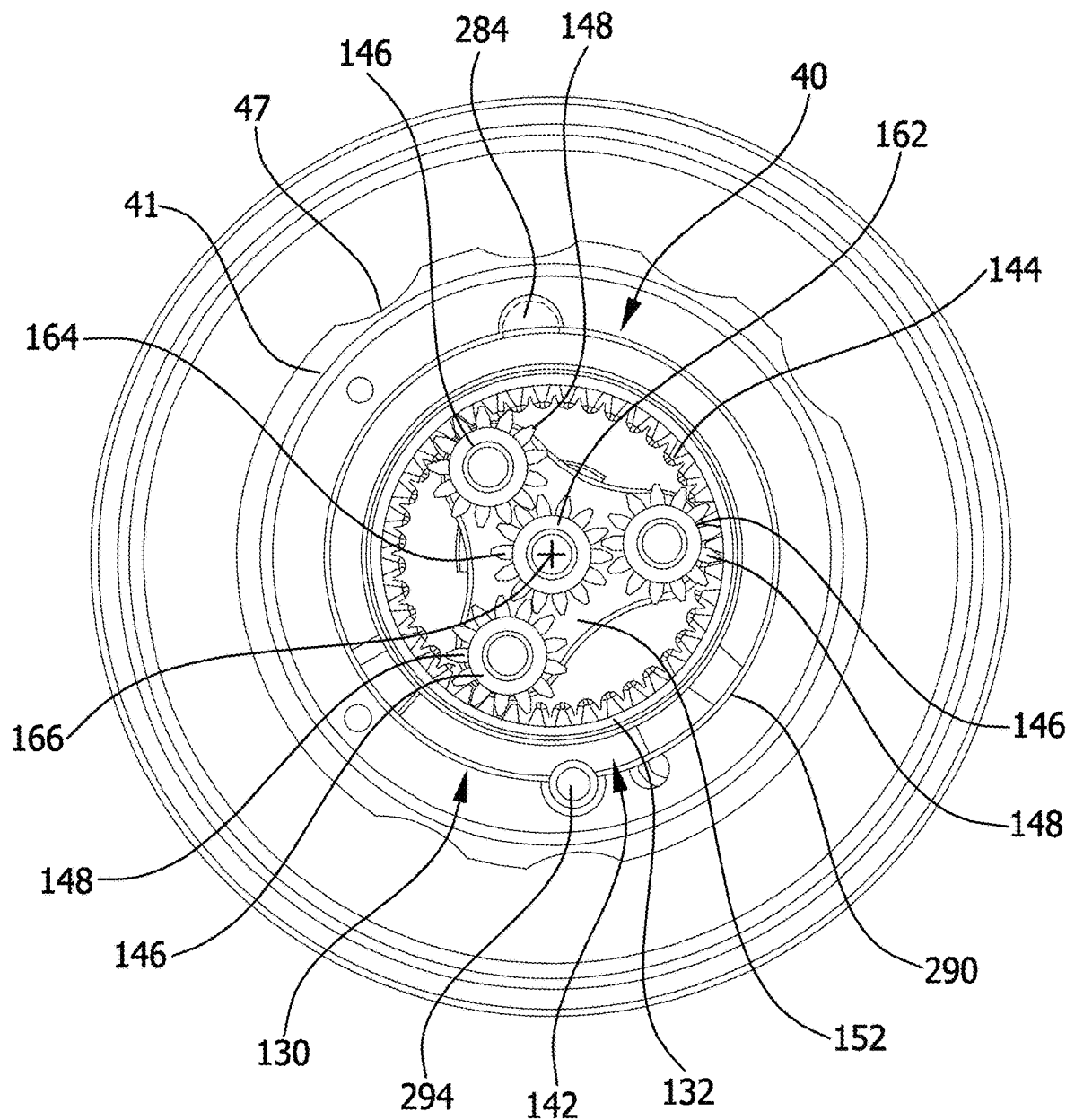
FIG. 15 shows a section along the line 15-15 in FIG. 6, without a bearing plate or holding ring.

Moreover, the guide body 40 comprises a prolonged portion 41 that extends through an aperture 27 in the bearing plate 26 and has a receptacle 43 that follows on from the prolonged portion 41 on an opposite side to the flange 42, for a holding ring 45 that is configured to be fixed at the receptacle 43, with the result that the guide body 40 is seated with positive engagement in the bearing plate 26, such that it cannot rotate in relation thereto, by the prolonged portion 41 as a result of its non-rotationally symmetrical but, rather, radially varying external contour 47 (FIG. 15) in the correspondingly shaped aperture 27, and is fixed to this bearing plate 26 by the flange 45 and the holding ring 43, which abut against opposite sides of the bearing plate 26.

Thus, as a result of being fixedly connected to the bearing plate 26 and the carrier 24, the guide body 40 forms the rotary bearing, fixed to the vehicle, for the pivot bearing body 14.

For the purpose of fixing the pivot bearing body 14 in the working position A, the pivot bearing unit 20 is provided with a rotation-blocking device, designated 50 as a whole (FIGS. 7 to 14), which has an actuation body 52, a plurality of rotation-blocking bodies 54 that are urgeable by the actuation body 52 and of which each is guided such that they are movable in a guide receptacle 56 in the guide sleeve 44 in a guide direction 58 extending substantially radially in relation to the pivot axis 22.

Preferably, at least the rotation-blocking bodies 54 and the guide receptacles 56 are arranged symmetrically in relation to a geometric plane that runs perpendicular to the pivot axis 22, intersects the rotation-blocking bodies 54 and corresponds to the plane of the drawing in FIGS. 7 to 14.

Further, the rotation-blocking device 50 comprises working position receptacles 60A that extend in particular in the radial direction in relation to the pivot axis 22, starting from the inner face 48 of the pivot bearing body 14 and extending into it, wherein the rotation-blocking bodies 54 are configured to be brought into engagement with the working position receptacles 60A in the working position A, and wherein the working position receptacles 60A have wall faces that are at a smaller and smaller spacing from one another in the radial direction in relation to the pivot axis 22. Moreover, the rotation-blocking device 50 comprises, in addition to the working position receptacles 60A, rest position receptacles 60R that in the simplest case take the same form as the working position receptacles 60A.

Figure 13:
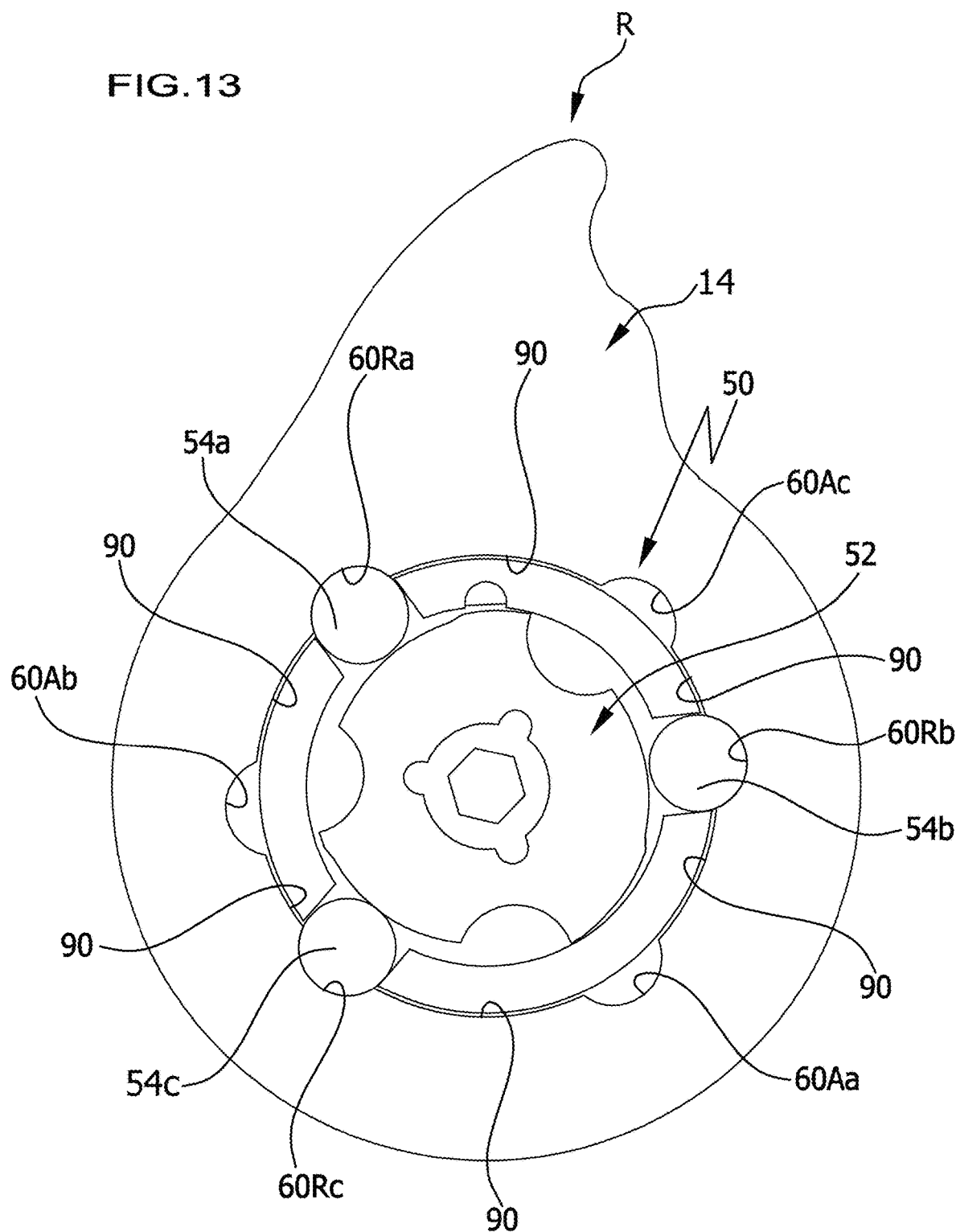
FIG. 13 shows an illustration similar to FIG. 7, in the rest position.

If for example the rotation-blocking device 50 comprises a set of three rotation-blocking bodies 54a, 54b and 54c—as illustrated in the first exemplary embodiment in conjunction with FIG. 7 to FIG. 14—then the guide sleeve 44 has a corresponding set of three guide receptacles 56a, 56b and 56c in which the rotation-blocking bodies 54a, 54b and 54c are displaceably guided in the guide direction 58, which runs substantially radially in relation to the pivot axis 22, and the pivot bearing body 14 is provided with a set of working position receptacles 60Aa, 60Ab and 60Ac with which the rotation-blocking bodies 54a, 54b, and 54c are configured to be brought into engagement in the working position A (FIG. 7), and with a set of rest position receptacles 60Ra, 60Rb, 60Rc with which the rotation-blocking bodes 52 are configured to be brought into engagement in the rest position R (FIG. 13).

For the purpose of suitably moving and positioning the rotation-blocking bodies 54 in the guide direction 58, the actuation body 52 is provided with a set, corresponding to the number of rotation-blocking bodies 54, of for example a total of three retraction receptacles 62a, 62b and 62c and pressure faces 66a, 66b and 66c that adjoin the respective retraction receptacles 62a, 62b and 62c in a direction of revolution 64 and take the form of wedge faces acting radially in relation to the pivot axis 22, wherein, in their release position, the rotation-blocking bodies 54 can penetrate far enough into the retraction receptacles 62a, 62b, 62c (FIG. 8) for them no longer to project beyond the outer face 46 of the guide sleeve 44, and wherein the pressure faces 66a, 66b, 66c each extend, from a radially inward starting region 68a, 68b and 68c that directly adjoins the respective retraction receptacle 62, increasingly radially outward in relation to the pivot axis 22 as their extent in the direction of revolution 64 increases, as far as a respective radially outward end region 70a, 70b and 70c and thus, when there is a rotary movement of the actuation body 52, act as wedge faces on the rotation-blocking bodies 54 in order to move them into their rotation-blocking position.

Preferably in this case, the pressure faces 66 extend in the manner of spiral or involute segments in relation to the pivot axis 22.

Figure 8:
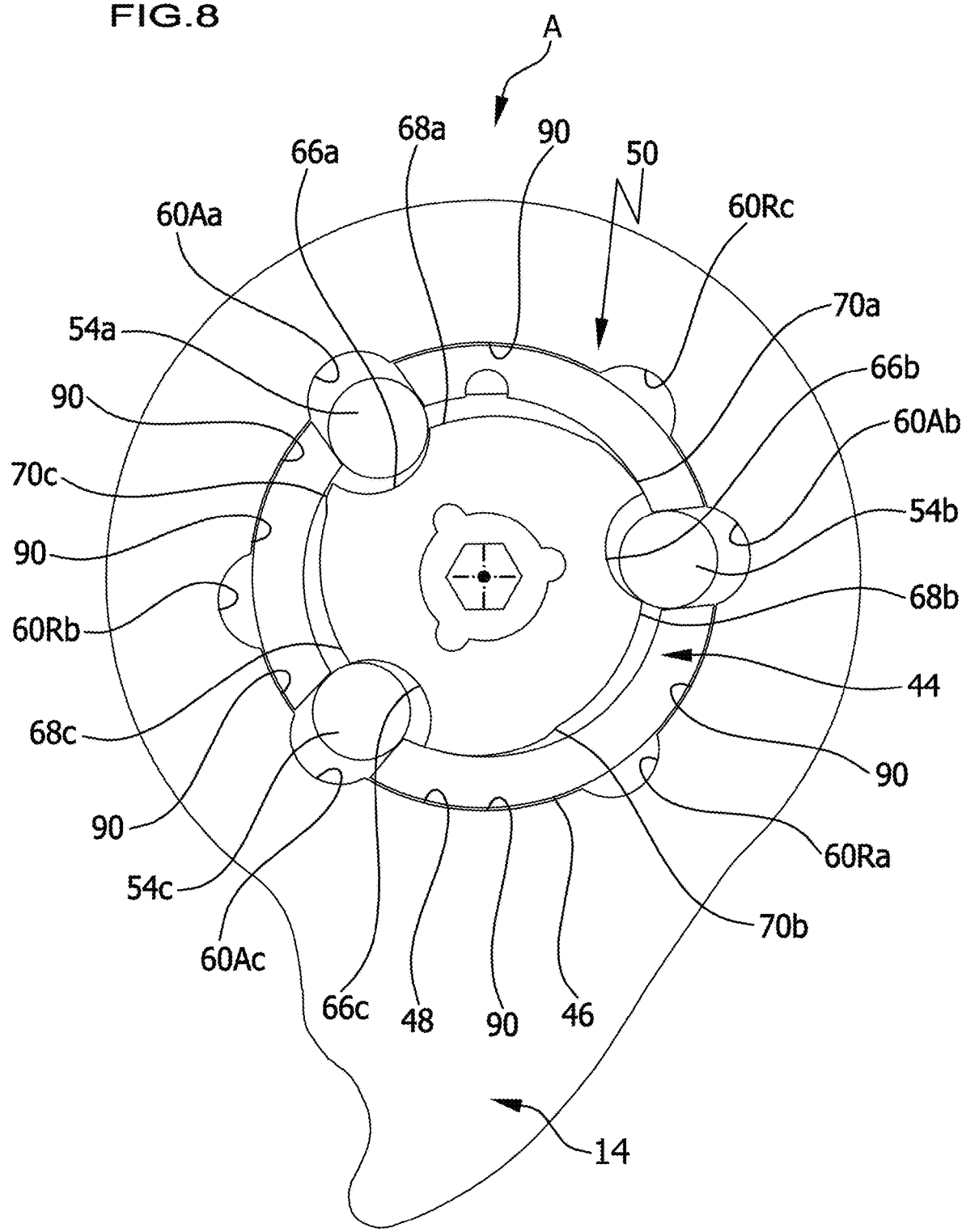
FIG. 8 shows an illustration of a section similar to FIG. 7, in the release position, with the actuation body rotated to a release position and rotation-blocking bodies in the release position.
Figure 9:
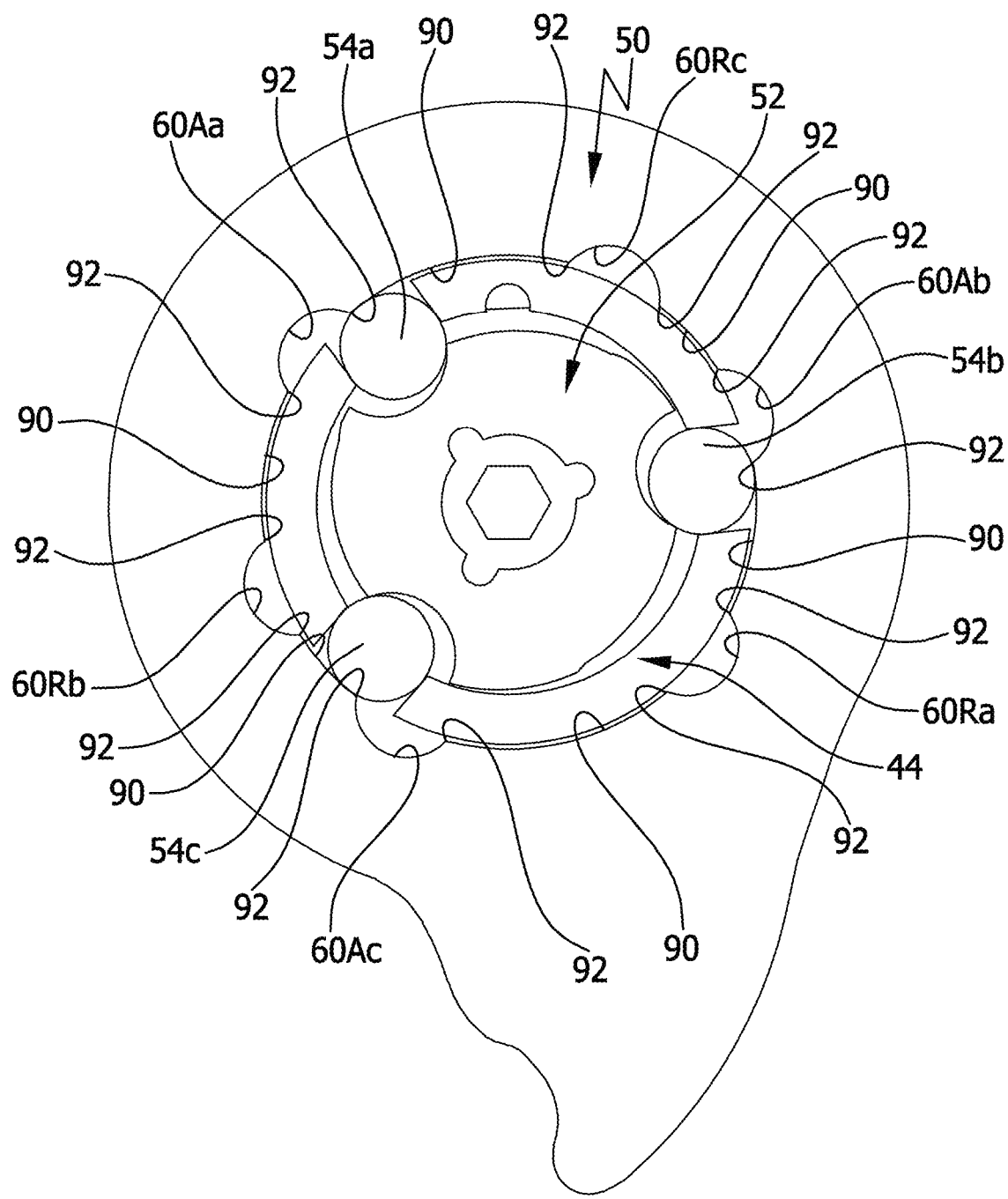
FIG. 9 shows an illustration similar to FIG. 8, with the pivot bearing body pivoted slightly out of the working position, with the actuation body blocked and under the action of the torsion spring.
Figure 14:
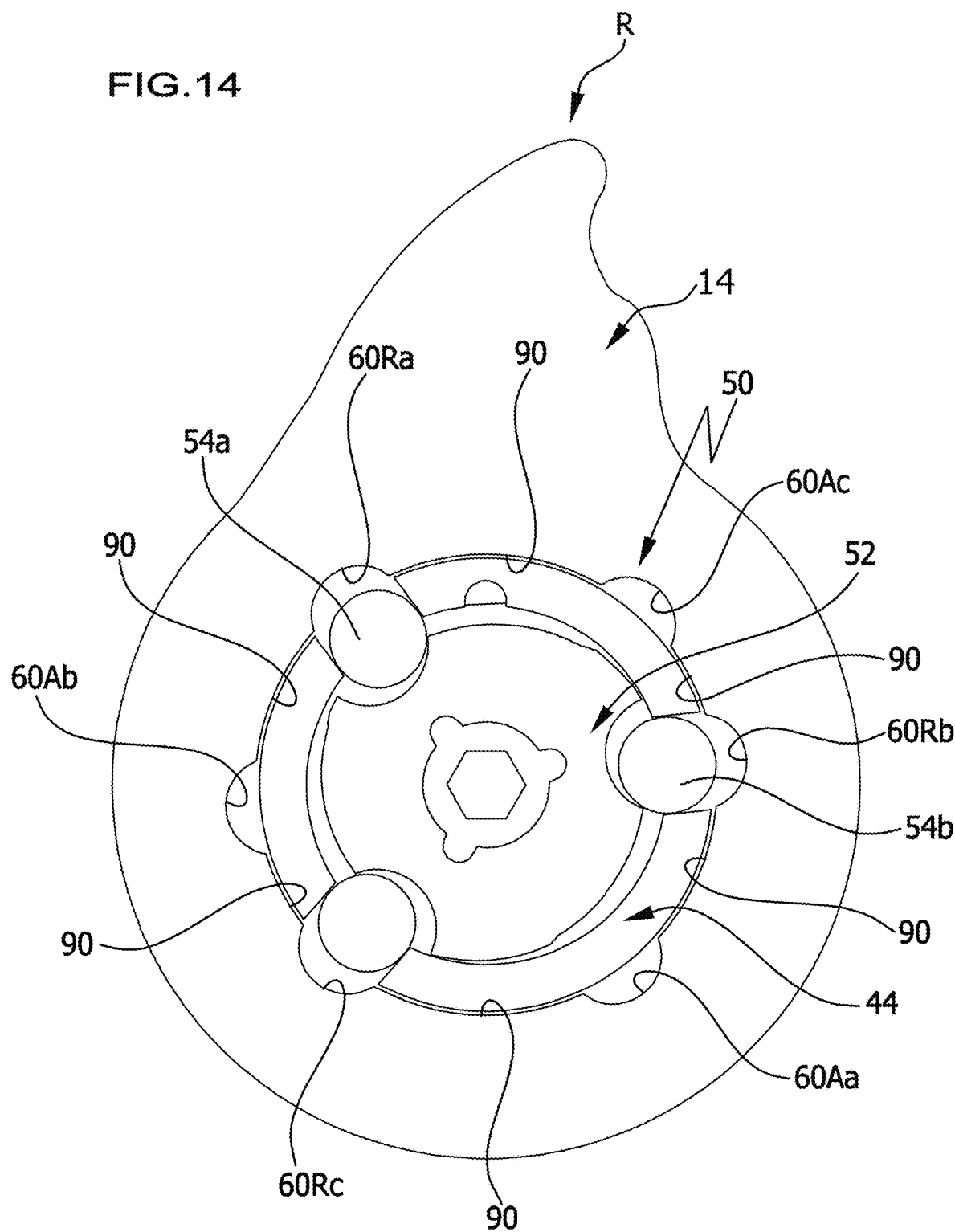
FIG. 14 shows an illustration similar to FIG. 8, in the rest position.

In order either to keep the rotation-blocking bodies 54 in their rotation-blocking position as a result of their being urged by the pressure faces 66 between the starting region 68 and the end region 70, or to allow them to penetrate into the retraction receptacles 62 in the release position, the actuation body 52 is likewise rotatable about the pivot axis 22, in particular coaxially thereto, such that either the set of retraction receptacles 62a, 62b and 62c faces the rotation-blocking bodies 54 and—as illustrated in FIG. 8—in its inactive position or release position allows these to penetrate into the retraction receptacles 62 in the radial direction toward the pivot axis 22 during transfer into the release position, in order to enable the respective rotation-blocking bodies 54 to come out of the working position receptacles 60A or the rest position receptacles 60R and to release the pivot bearing body 14 for rotation about the pivot axis 22 in relation to the guide body 40, such that the pivot bearing body 14 and with it the ball neck 10 is freely and unimpededly rotatable in relation to the guide sleeve 44—as illustrated in FIG. 8 and FIG. 14—in which case the rotation-blocking bodies 54 do not extend beyond the outer face 46 of the guide sleeve 44.

Rotating the actuation body 52 in a direction of rotation 72 in opposition to the direction of revolution 64 when the rotation-blocking bodies 54 are seated in the retraction receptacles 62 has the effect that the rotation-blocking bodies 54 are moved out of the retraction receptacles 62 and initially, in the active position or rotation-blocking position of the actuation body 52, lie on the starting regions 68 of the pressure faces 66 but in so doing already penetrate for example into the receptacles 60 and hence, in their rotation-blocking position, prevent the pivot bearing body 14 from being able to rotate freely in relation to the guide body 40.

Figure 7:
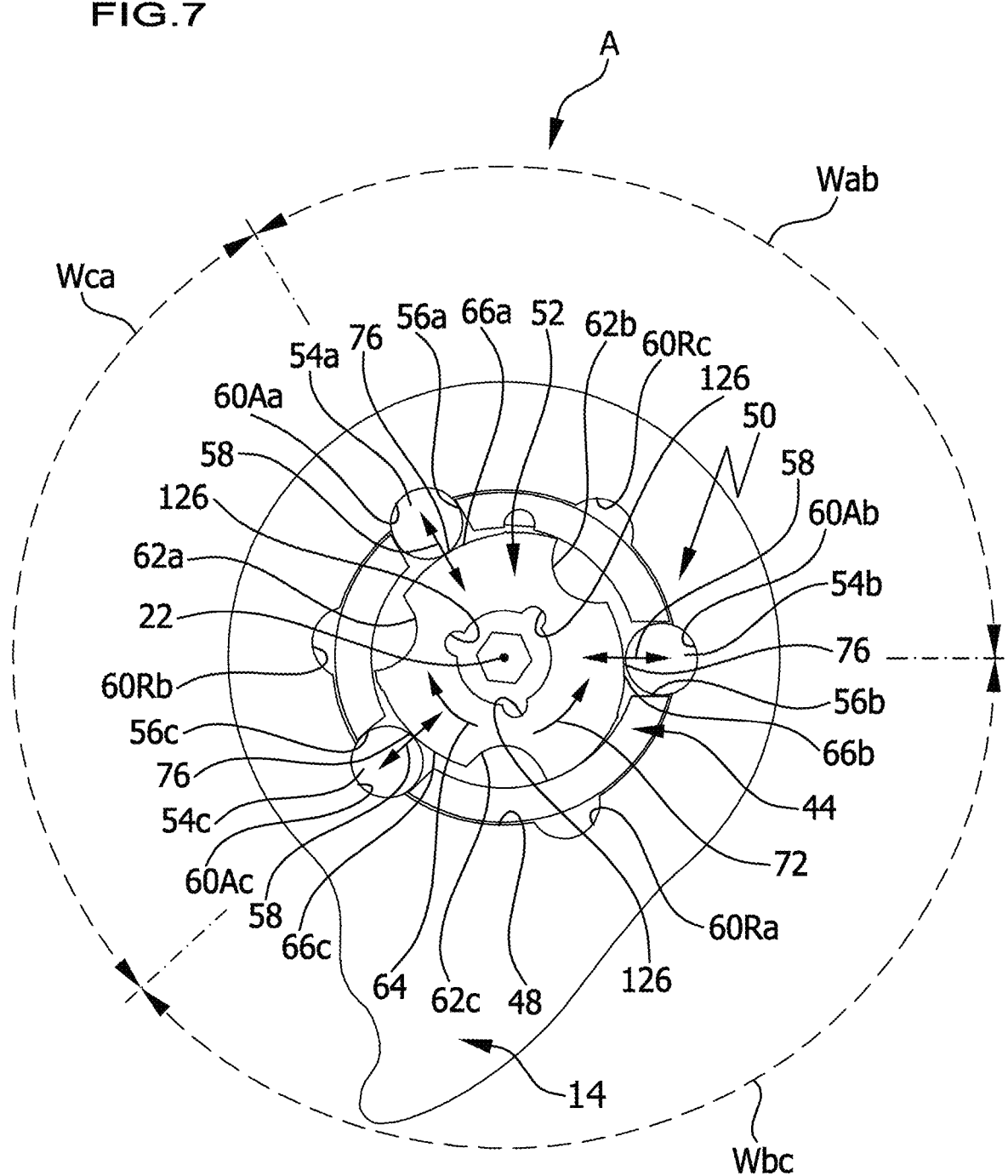
FIG. 7 shows a section along the line 7-7 in FIG. 6, in the working position, with rotation blocking by rotation-blocking bodies in a rotation-blocking position.

If the actuation body 52 is rotated further in the direction of rotation 72, in opposition to the direction of revolution 64, then regions of the pressure faces 66 that lie further and further radially outward in relation to the pivot axis 22 act on the rotation-blocking bodies 54, and thus, in the working position A or the rest position R of the ball neck 10, push the rotation-blocking bodies 54 further and further into the working position receptacles 60Aa, 60Ab and 60Ac, FIG. 7, or into the rest position receptacles 60Ra, 60Rb and 60Rc, FIG. 13, in order in this way to achieve substantially play-free fixing of the pivot bearing body 14 in relation to the guide body 40, in this case in relation to the guide sleeve 44.

In the rotation-blocking position of the rotation-blocking bodies 54, the actuation body 52 is in its active position in such a way that—as illustrated in FIG. 7 and FIG. 13—the rotation-blocking bodies 54 lie approximately on central regions 76, located between the starting regions 68 and the end regions 70, of the pressure faces 66 and are urged thereby.

In order to enable the actuation body 52 to urge each of the three rotation-blocking bodies 54 respectively in optimum manner, in the active position it is provided for the actuation body 52 to undergo centering corresponding to the position of the rotation-blocking bodies 54. In particular, the actuation body 52 is mounted in the guide sleeve 44 such that, because of the radial play, the actuation body 52 can center itself relatively within the guide body 40 in a manner corresponding to the position of the rotation-blocking bodies 54 that results from manufacturing tolerances, wherein the self-centering of the actuation body 52 may differ slightly from a coaxial arrangement in relation to the geometric pivot axis 22.

Because of the self-centering, the rotation-blocking bodies 54a, 54b and 54c act on the working position receptacles 60Aa, 60Ab and 60Ac or the rest position receptacles 60Ra, 60Rb and 60Rc in the respective guide direction 58a, 58b and 58c with forces of approximately equal size, with the result that the reaction forces acting on the actuation body 52 are also of approximately equal size.

Preferably, the rotation-blocking bodies 54 take the form of balls, which thus abut on one side against the actuation body 52 and on the other also against the receptacles 60.

Thus, the actuation body 52 is mounted in relation to the pivot axis 22 such that it is only rotatable with play, and this is primarily of relevance when the actuation body 52 keeps the rotation-blocking bodies 54 in a release position in which the rotation-blocking bodies 54 penetrate into the retraction receptacles 62 of the actuation body 52.

In order to cause the actuation body 52 thus always to move in the direction of rotation 72 in the absence of any external action, wherein the rotation-blocking bodies 54 move in the direction of the rotation-blocking position, the actuation body 52 is urged by a torsion spring 114 (FIG. 6) that on the one hand acts on the actuation body 52 and on the other is supported radially outward against the guide body 40.

The torsion spring 114 also has the effect that the actuation body 52 presses the rotation-blocking bodies 54 into the working position receptacles 60A or the rest position receptacles 60R in a manner urged by force, and in this way the pivot bearing body 14 is fixed without play, the absence of play being maintained even in the event of the geometry of the working position receptacles 60A or the rest position receptacles 60R changing under operational load as a result of a further rotation of the actuation body 52 in the direction of rotation 72.

The guide receptacles 56—of which there are for example three—and the rotation-blocking bodies 54 arranged therein, and the retraction receptacles 62 respectively associated with these rotation-blocking bodies 54 and having the pressure faces 66 adjoining these in the actuation body 52, respectively form three rotation-blocking units 80, and these are arranged around the pivot axis 22 at mutually unequal angular spacings Wab, Wbc, Wca (in relation to the respective center axes Ma, Mb, Mc), as a result of which—in relation to the pivot axis 22 as the axis of rotation—a rotation-blocking configuration of the rotation-blocking units 80 results in a congruent arrangement of the rotation-blocking units 80 only in the event of rotation of the rotation-blocking configuration about 360°.

For example, the angular spacing Wab=120°, the angular spacing Wbc=137°, and the angular spacing Wca=103°—that is to say that there is a deviation from equal angular spacings of 17°.

However, if there are for example three rotation-blocking units, there are also in particular deviations from equal angular spacings of up to 30° or more possible, with the result that angular spacings of for example Wab=120°, Wbc=150° and Wca=90° are possible.

Similarly, the working position receptacles 60A and the rest position receptacles 60R are respectively arranged relative to one another, in relation to the pivot axis 22, in each case in a receptacle configuration having the same angular spacings in relation to one another as the rotation-blocking units 80 that, in relation to the pivot axis 22, likewise result in a congruent arrangement of the respective receptacle configuration only in the event of rotation about 360° such that in the working position A or the rest position R this is congruent with the rotation-blocking configuration, with the result that in the working position A or the rest position R a respective rotation-blocking body 54 of one of the rotation-blocking units 80 is opposite one of the working position receptacles 60A or one of the rest position receptacles 60R and can come into engagement therewith in the rotation-blocking position, as illustrated in FIG. 7 and FIG. 13, as a result of which the pivot bearing body 14 is fixed such that it cannot rotate in relation to the pivot bearing unit 20 (FIG. 7, FIG. 13).

However, if in the working position A or the rest position R the actuation body 52 moves into the release position, in opposition to the force action of the torsion spring 114—as described below—then each of the rotation-blocking bodies 54 of the respective rotation-blocking unit 80 is able to penetrate into the retraction receptacle 62 associated therewith and to come out of the respective working position receptacle 60A or rest position receptacle 60R, such that the pivot bearing body 14 is pivotal out of the working position A or the rest position R about the pivot axis 22 (FIG. 8, FIG. 14).

As soon as the pivot bearing body 14 has come out of the working position A or the rest position R (FIG. 9), it is no longer possible for all of the rotation-blocking units 80 arranged in the rotation-blocking configuration in relation to the pivot axis 22 to come into engagement with all of the operative positon receptacles 60A or rest position receptacles 60R arranged in the respective receptacle configuration in all the pivotal positions between the working position A or the rest position R, with the result that when the actuation body 54 is urged in the direction of rotation 72 it is no longer possible for all of the rotation-blocking bodies 54 that are seated in the retraction receptacles 62 to come into engagement with all of the working position receptacles 60A or rest position receptacles 60R, since, although the rotation-blocking bodies 54 can indeed be urged in the direction of the pivot bearing body 14 by the actuation body 52 that is urged in the direction of rotation 72 by the torsion spring 114, in particular by the concave root faces of the retraction receptacles 62, which run obliquely relative to the guide direction 58, nonetheless in any of the rotary positions of the pivot bearing body 14 that are outside the working position A it is never the case that all of the rotation-blocking bodies 54 are each opposite one receptacle out of all of working position receptacles 60A and rest position receptacles 60R, and so it is always the case that at least one of the rotation-blocking bodies 54 is blocked by one of blocking faces 90 that run between the working position receptacles 60A and rest position receptacles 60R and in the simplest case is formed by the cylindrical inner face 48 of the pivot bearing body 14, and as a result prevents rotation of the actuation body 52, brought about by the torsion spring 114, in the direction of rotation 72, with the result that even if the torsion spring 114 acts in the direction of rotation 72 the actuation body 52 is kept in the release position in all the pivotal positions of the pivot bearing body 14 outside the working position A and the rest position R, and consequently can only transfer into the rotation-blocking position again once the working position A is reached.

Preferably, the deviation of the rotation-blocking configuration of the rotation-blocking unit 80 and the receptacle configuration of the receptacles 60 from a symmetrical arrangement is sufficiently great that, when one of the rotation-blocking units 80 is opposite one of the working position receptacles 60A or rest position receptacles 60R such that the rotation-blocking body 54 could come into engagement with this working position receptacle 60A or rest position receptacle 60R, at least one—or preferably at least two—rotation-blocking units 80 are offset from the closest receptacle of the working position receptacle 60A or the rest position receptacles 60R in the direction of rotation far enough for a point of contact of the rotation-blocking body 54 associated with this rotation-blocking unit 80 already to lie on one of the blocking faces 90 and not to be able to come to lie in the region of one of the receptacles 60, with the result that reliable blocking of the actuation body 52 is ensured by the blocking faces 90 that are active in the release position, in particular if the actuation body 52 is urged in the direction of rotation 72 by the torsion spring 114.

If the actuation body 52 is acted on in a direction of rotation 64 in opposition to the action of the torsion spring 114 and rotated to the maximum extent, then, in all the pivotal positions of the pivot bearing body 14, the rotation-blocking bodies 54 lie between the respective blocking face 90 and the retraction receptacles 62 with play.

If, however, the action of the torsion spring 114 in the direction of rotation 72 is dominant, then, even in the event of pivoting between the working position A and the rest position R, the conditions in the respective pivotal positions of the pivot bearing body 14 are those illustrated in FIGS. 9 to 12.

Figure 10:
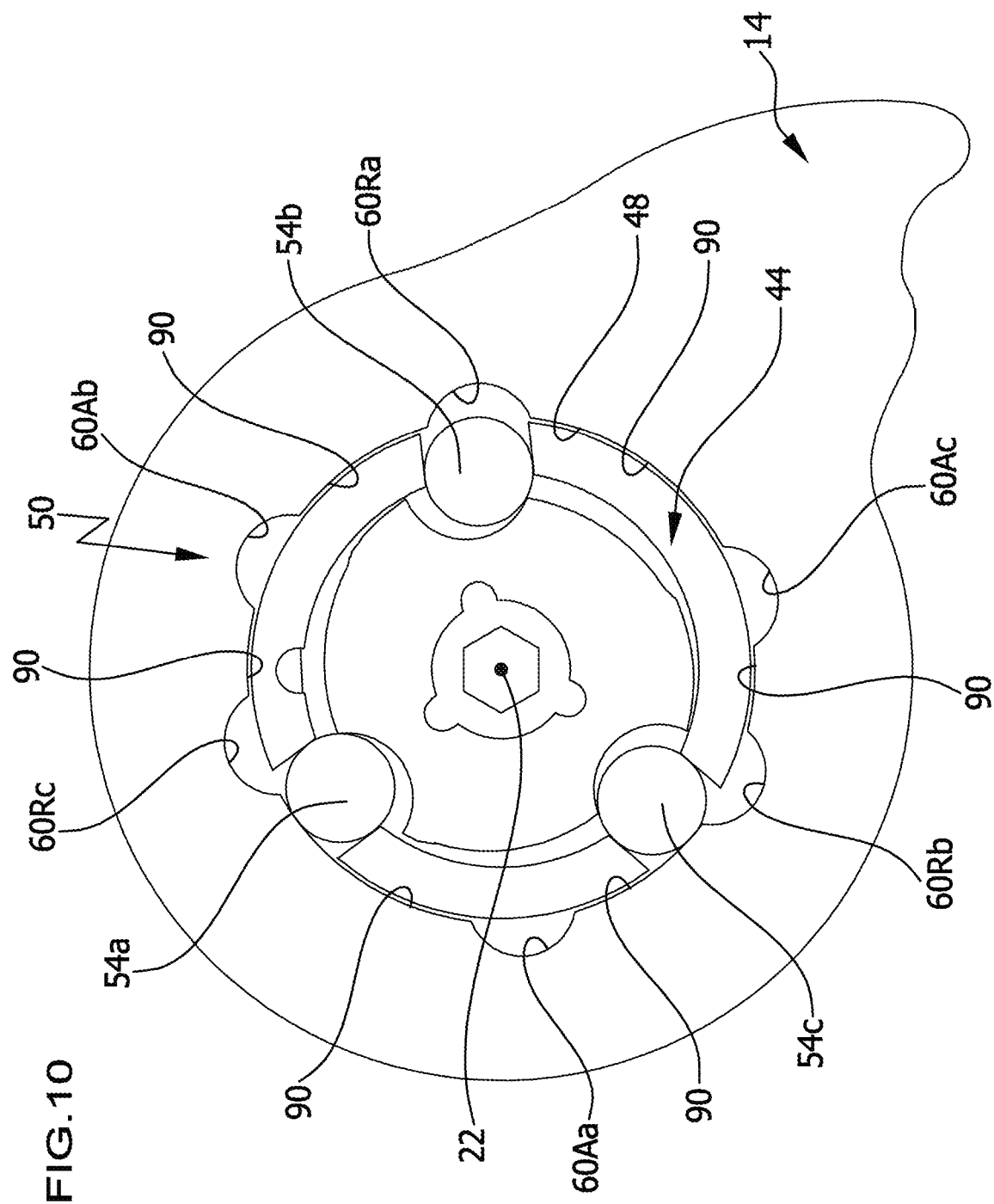
FIG. 10 shows an illustration similar to FIG. 8, with the pivot bearing body rotated further in the direction of the rest position, but in the release position.
Figure 11:
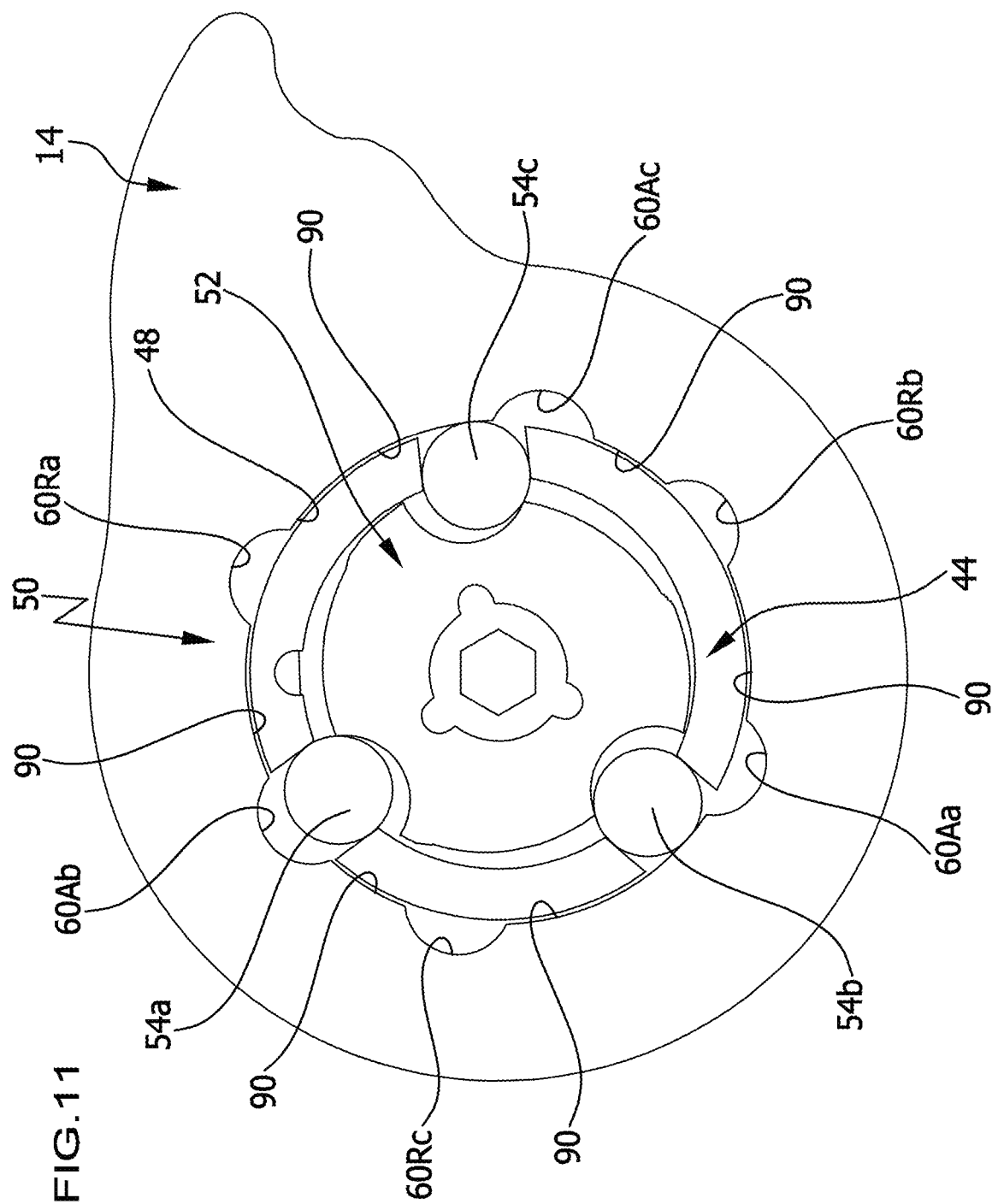
FIG. 11 shows an illustration similar to FIG. 10, with the pivot bearing body rotated further in the direction of the rest position.
Figure 12:
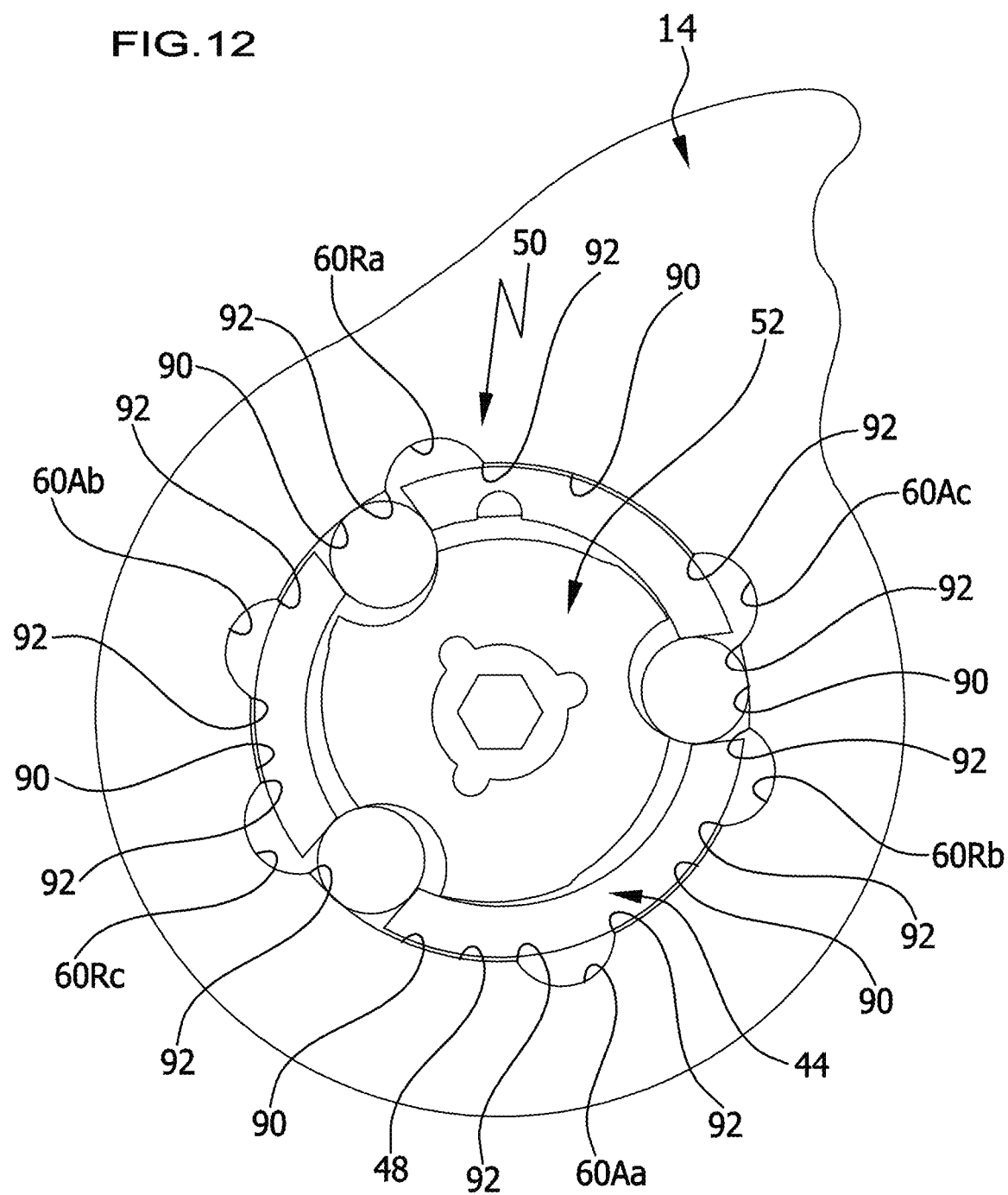
FIG. 12 shows an illustration similar to FIG. 11, with the pivot bearing body rotated further in the direction of the rest position.

FIGS. 9 to 12 show that the actuation body 52 is kept in the release position in each of the pivotal positions of the pivot bearing body 14 by at least one, preferably two rotation-blocking bodies 54 that abut against one of the blocking faces 90, and prevent one of the rotation-blocking bodies 54—for example the rotation-blocking body 54*b* in FIG. 10 or the rotation-blocking body 54a in FIG. 11—from being able to engage in the receptacle 60 that is respectively aligned therewith.

In each case, the conditions according to FIGS. 7 to 14 are present when pivoting between the rest position R and the working position A, wherein because the rotation-blocking bodies 54 abut against the blocking faces 90 according to FIGS. 9 to 12 during pivoting between the rest position R and the working position A the rotation-blocking bodies 54 slide, with little noise development from the blocking faces 90 over each other, directly and in particular continuously against these adjoining opening edges 92 of the working position receptacles 60A and the rest position receptacles 60R and into the working position receptacles 60A or the rest position receptacles 60R, and are transferred into the rotation-blocking position according to FIG. 7 or FIG. 13.

By means of a portion that forms a receptacle 102 for the actuation body 52, the guide sleeve 44 preferably extends between the flange 42 and a flange 104 that terminates the guide sleeve 44, extends radially toward the pivot axis 22, and is preferably integrally formed in one piece with the guide sleeve 44 and delimits the receptacle 102 for the actuation body 52, with the result that the actuation body 52 is guided, radially in relation to the pivot axis 22, by the receptacle 102 in the guide sleeve 44 and is guided axially in the direction of the pivot axis 22 by abutting against an inner side 108 of the flange 104.

Further, the flange 104 also has a receptacle 106 that is coaxial in relation to the pivot axis 22 and into which there Is inserted, in particular screwed, an insert 110 through which a stationary shaft 100 passes, wherein the insert 110 is seated in the receptacle 106 and fixes the shaft 100 such that it cannot rotate in relation to the guide sleeve 44.

On an opposite side of the receptacle 102 for the actuation body 52 to the flange 104, the guide sleeve 44 forms, for example by means of a portion passing through the flange 42, a torsion spring receptacle 112 in which there is arranged, adjoining the actuation body 52, the torsion spring 114, which is fixed on the one hand by means of an outer end in the torsion spring receptacle 112 and is connected by means of an inner end to a drive sleeve 122, which is coupled to the actuation body 52 such that it cannot rotate in relation thereto.

Figure 6:
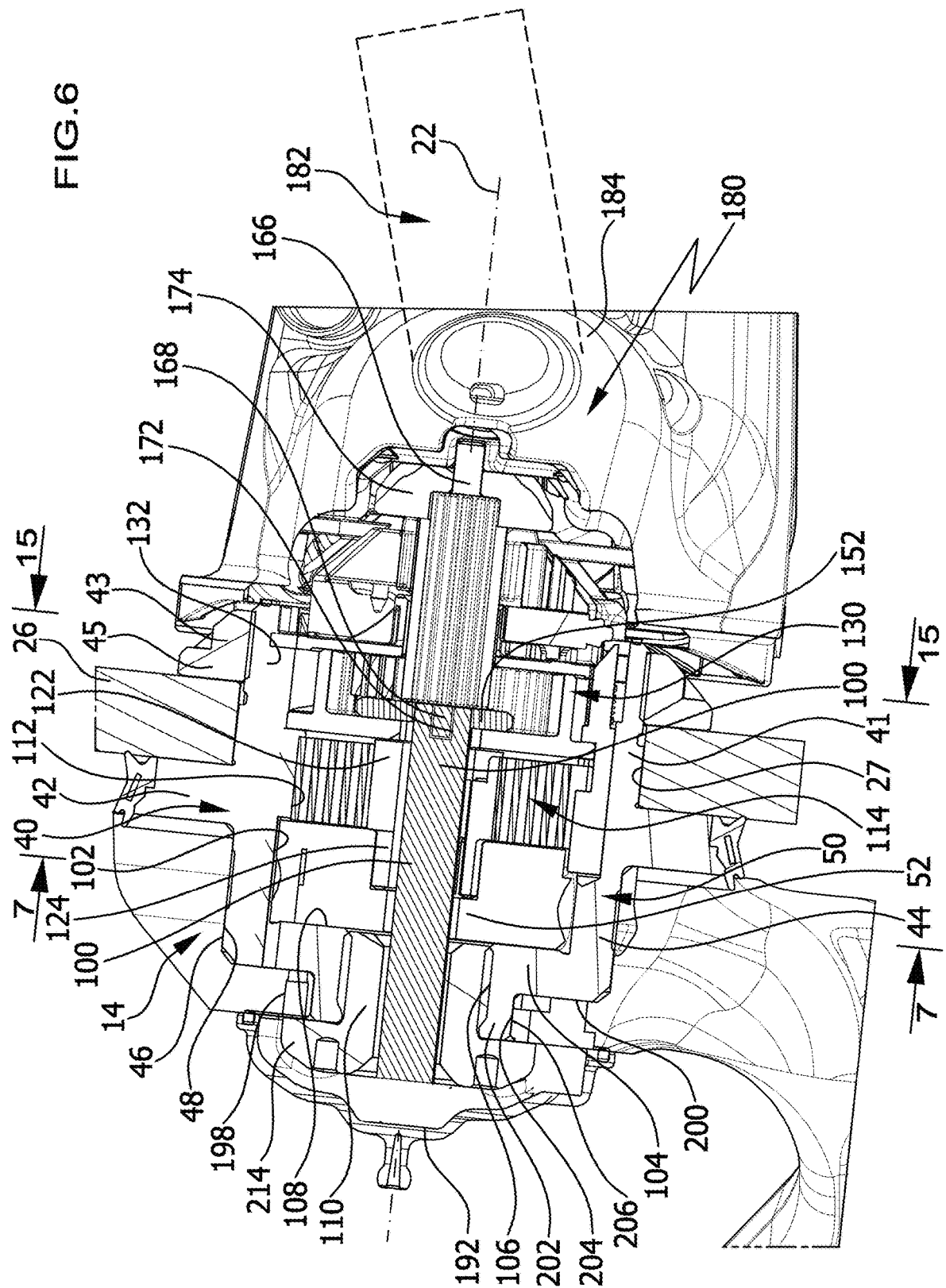
FIG. 6 shows an illustration of a section along the line 6-6 in FIG. 3.
Figure 16:
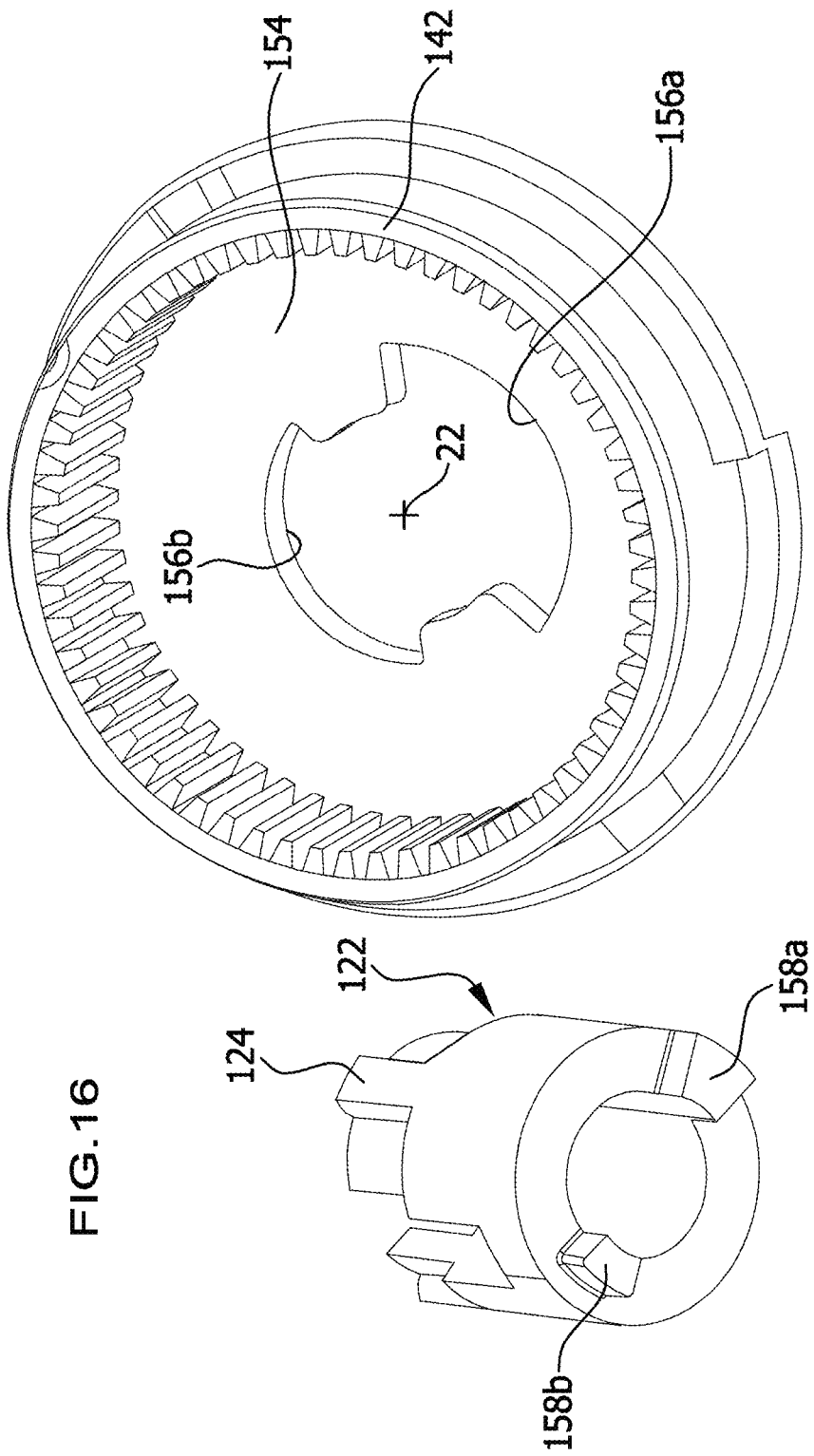
FIG. 16 shows a perspective illustration of a ring gear and a drive sleeve that cooperates therewith.

For this purpose, and as illustrated in FIGS. 6, 7 and 16, the drive sleeve 122 is provided for example with prolonged portions 124 that engage in corresponding recesses 126 in the actuation body 52 for the purpose of making a positively engaging connection.

Because the torsion spring 114 acts on the drive sleeve 122, which is coupled to the actuation body 52 such that it cannot rotate in relation thereto, as a result of the torsion spring 114 acting on the drive sleeve 122 the actuation body 52 is driven in the direction of rotation 72, such that the actuation body 52, while the torsion spring 114 acts unimpededly on the drive sleeve 122, always urges the actuation body 52 in the direction of rotation 72, with the result that the actuation body 52 tends to move the rotation-blocking bodies 54 in a manner urged by force in the guide direction 58, radially outward away from the pivot axis 22, wherein this movement is prevented by the blocking faces 90 in all the pivotal positions of the pivot bearing body 14 that are provided with the exception of the working position A and the rest position R, and consequently it is only in the working position A and the rest position R that the rotation-blocking bodies 54 are pushed into the working position receptacles 60A and the rest position receptacles 60R and thus the pivot bearing body 14 is fixed such that it cannot rotate in relation to the guide sleeve 44 and in particular is fixed without play.

In order that the rotation-blocking bodies 54 can move into the release position, action on the actuation body 52 in opposition to the direction of rotation 72 and thus also in opposition to the action of the torsion spring 114 is required.

For this purpose, the drive sleeve 122 is configured to be driven by means of a planetary gear 130 that is designated 130 as a whole (FIG. 6) and is arranged in a gear receptacle 132 in the guide sleeve 44, in particular coaxially in relation to the pivot axis 22, and is arranged for example partly within the aperture 27 in the bearing plate 26 and preferably extends away from the aperture 27 in the bearing plate 26 on an opposite side to the flange 42.

The planetary gear 130 (FIG. 15) for its part comprises a ring gear 142 that is guided in the gear receptacle 132 and is provided with an internal toothing 144 with which planet wheels 146 engage by means of their external toothing 148.

Here, the planet wheels 146 are held rotatably on a planet wheel carrier 152 that for its part is connected to the stationary shaft 100 such that it cannot rotate in relation thereto.

Further—as illustrated in FIG. 16—the ring gear 142 comprises a flanged body 154 that is located between the planet wheel carrier 152 and the torsion spring 114 and likewise extends in the direction of the shaft 100 and surrounds it, albeit being rotatable in relation thereto, and forms an output drive of the planetary gear 130 for actuating the rotation-blocking device 50.

As illustrated in FIG. 16, the flanged body 154 has arcuate drive slots 156a, 156b, which are arranged peripherally around the pivot axis 22, cooperate with drive fingers 158a, 158b of the drive sleeve 122 that engage therein, and yet take a form such that the difference between the angular range around the pivot axis 22 over which the drive slots 156 extend and the angular range around the pivot axis 22 over which the drive fingers 158 extend makes it possible to free movement of the drive sleeve 122 from the ring gear 142 in a manner that is explained in detail below.

Further, the planet wheels 146 engage by means of their external toothing 148 with an external toothing 164 of a sun wheel 162 of the planetary gear 130, the sun wheel 162 being seated on a drive shaft that is designated 166 as a whole, is arranged coaxially in relation to the pivot axis 22, and is mounted, for example by means of an end shaft journal 168 that engages in an end bore 172 in the stationary shaft 100, in a manner freely rotatable in relation to the pivotal drive shaft 100 but coaxial therewith.

The drive shaft 166 carries, at a spacing from the planetary gear 130, a drive gearwheel 174, for example a bevel gearwheel, which is driven by an output gearwheel of a motorized drive unit 182 that comprises for example on the one hand a drive motor, preferably an electric motor, and on the other a step-down gear for driving the drive gearwheel.

The drive unit 182 is held for example on a cover body 184 that, from the bearing plate 126, engages over the drive shaft 166 with the drive gearwheel 174 and over the output gearwheel meshing therewith, and moreover forms a bearing for the drive shaft 166 on a side remote from the shaft journal 168.

In this way, the planetary gear 130 and the drive unit 182 form for example an actuation device 180 for the rotation-blocking device 50.

The stationary shaft 100, which is coupled to the planet carrier 152 such that it cannot rotate in relation thereto, is connected to the flange 104 of the guide body 40 such that it cannot rotate in relation thereto.

Here, an end flange 198 of the pivot bearing body 14 engages over the flange 104 of the guide body 40 in the external region 200 and extends as far as a guide attachment 202 of the flange 104, wherein the end flange 198 embraces, for example by means of a radially inner cylinder face 204, an outer cylinder face 206 of the guide attachment 202 and for example abuts against it and as a result is likewise additionally guided on the guide attachment 202, coaxially in relation to the pivot axis 22.

Moreover, extending in the receptacle 106 in the guide attachment 202 there is a thread 212 into which there is fixed, in particular screwed, the insert 110, which partially engages, by means of an outer flange 214, over the end flange 198 in a radially inner region, with the result that the end flange 198 of the pivot bearing body 14 is guided axially non-displaceably between the flange 104 and the outer flange 214 of the insert 110 and hence is guided such that it is axially non-displaceable in relation to the guide body 40.

Figure 17:
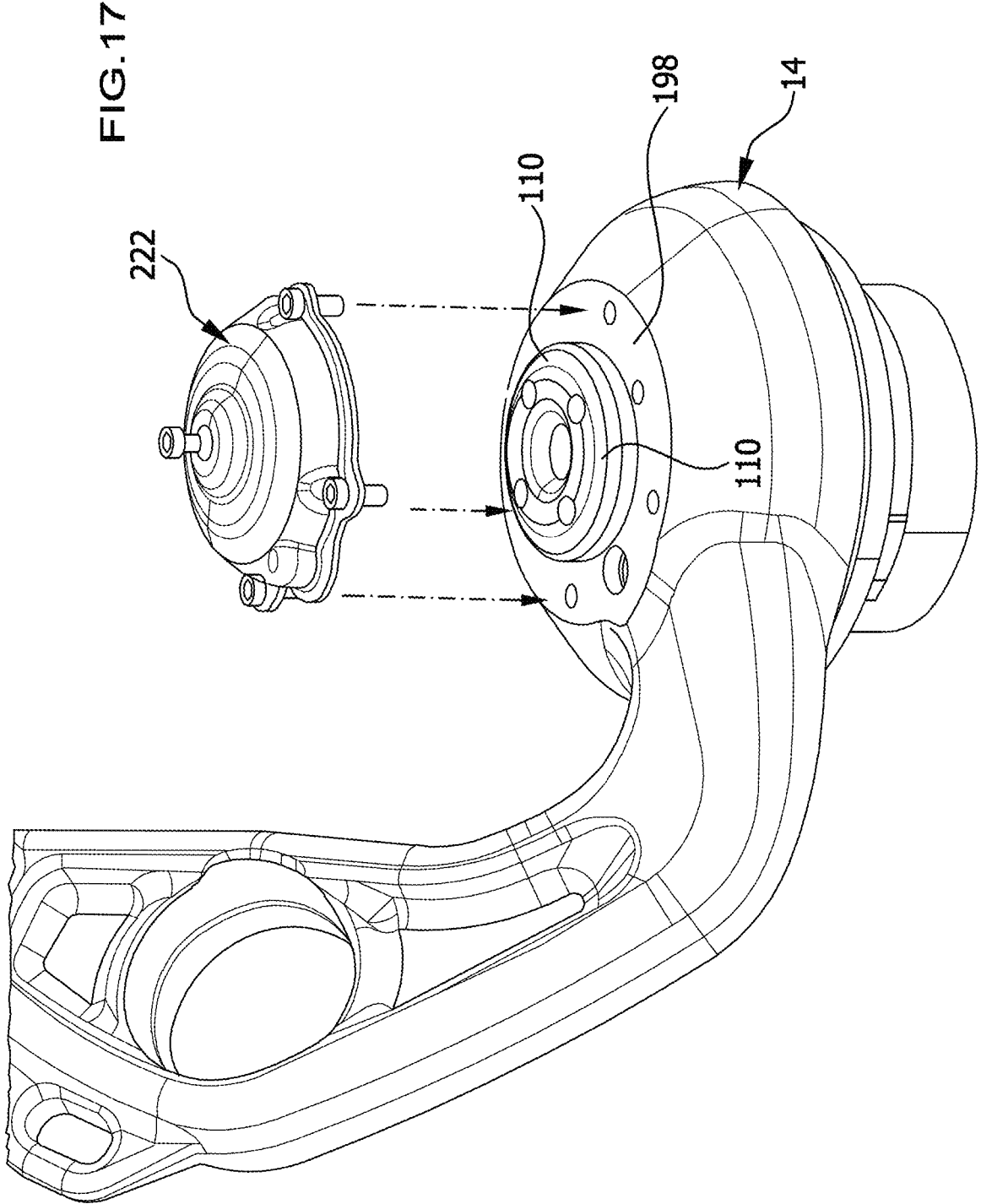
FIG. 17 shows a perspective exploded illustration of the pivot bearing body, with the cover.

Mounted on the end flange 198 such that it cannot rotate in relation thereto there is further a cover 222, with the result that the cover 222 with the pivot bearing body 14 a unit that is rotatable about the pivot axis 22 (FIG. 17).

Here, the cover 222 is seated on the end flange 198 and is fixed thereon such that it cannot rotate in relation thereto.

In the solution described above, a set of working position receptacles 60A is provided for fixing the pivot bearing body 14 in the working position A such that it cannot rotate, and a set of rest position receptacles 60R is provided for fixing the pivot bearing body 14 in the rest position R such that it cannot rotate.

FIGS. 20 to 26 show the cooperation of the rotary movement of the ring gear 142, starting from a rest position prevailing in the starting position, on rotation in a direction of rotation 292, with the drive sleeve 122 for driving the actuation body 52 by means of the drive slots 156a and 156b, which are arranged in the flanged body 154 of the ring gear 142, with the drive fingers 158a, 158b engaging in these drive slots 156a, 156b, and with a securing pin 294, which cooperates with a cam track 298, likewise formed by the cam flange 290, and scans this cam track 298 by means of a scanning surface 296 (FIG. 19), as explained in detail below.

If, with the working position A illustrated in FIG. 20 as the starting position, the ring gear 142 is now driven by means of the planetary gear 130, then the ring gear 142 rotates in the direction of rotation 292.

As can be seen from FIG. 21a, rotation of the ring gear 142 with the cam flange 290 is initially performed without driving the drive sleeve 122, since the drive slots 156a, 156b permit relative rotation of this kind by the ring gear in relation to the drive fingers 158a, 158b without entraining them.

Here, the ring gear 142 can be further rotated until the drive slots 156a, 156b abut against the drive fingers 158a, 158b in the direction of rotation 292 (FIG. 22). The fact that the drive sleeve 122 is entrained by entrainment of the drive fingers 158a, 158b about the pivot axis 22 now also results in rotation of the actuation body 52 in addition until—as illustrated in FIG. 22—the rotation-blocking bodies 54 can penetrate into the retraction receptacles 62 associated therewith and thus reach the release position (FIG. 23), in which they lie in the retraction receptacles 62, with the result that the rotation-blocking device 50 is now in its release position and clears a rotary movement of the pivot bearing body 14, with the result that this comes out of the working position A, for example because of the force of gravity acting in the working position A.

When the release position is reached, further rotary movement of the ring gear 142 in this direction is prevented by an abutment element 295 that comes into abutment against the securing pin 294, and, by enabling the pivotal movement of the pivot bearing body 14, there results pivoting thereof.

If the drive of the planetary gear 130 continues running, then the actuation body 52 is rotated as far as the release position, which is predetermined by the abutment element 295, by the ring gear 142 such that the rotation-blocking bodies 54 can penetrate into the retraction receptacles 62 to the maximum depth, with the result that the rotation-blocking bodies 54 are located with play between the retraction receptacles and the blocking face 90.

Coming out of the working position A causes the actuation body 52 to be blocked in the release position—as described above—by at least one rotation-blocking body 54 that abuts against the blocking faces 90, and moreover the rotary position of the drive sleeve 122 and thus also of its drive fingers 158a and 158b is also fixed in the rotary position that corresponds to the release position of the actuation body 52 and that likewise corresponds, according to FIG. 24, to the rotary position of the ring gear 142.

This position is illustrated in FIG. 24, and is achieved by the ring gear 142, starting from the position in FIG. 23, rotating further in the direction of rotation 292.

If, when the pivot element 14 pivots, driving of the planetary gear 130 is initially—in particular briefly—continued, then during pivoting of the pivot bearing body 14 with the ball neck 10 between the working position A and the rest position R, the actuation body 52 remains in the release position, rotated to the maximum extent.

Once the drive for the planetary gear 130 has been switched off, the ring gear 142 is driven by the planetary gear 130 such that it rotates back to the starting position, and the torque of the torsion spring 114 rotates the actuation body 52 in the direction of rotation 72, with the result that, by means of the concave root faces running obliquely in relation to the respective guide direction 58, the retraction receptacles 62 act on the rotation-blocking bodies 54 and bring at least one of them into abutment against one of the blocking faces 90 until the respectively other position—that is, the rest position R or the working position A—is reached.

If the ring gear 142 has no effect, at the latest just before the respectively other position is reached, then at the latest at this stage the torsion spring 114 rotates the actuation body 52 far enough in the direction of rotation 72 for the retraction receptacles 62 to act on the rotation-blocking bodies 54 and for the respective rotation-blocking bodies 54 that are in front of one of the blocking faces 90 to be brought into abutment against the blocking faces 90.

Before the respectively other position of the pivot bearing body 14 is reached—that is to say the rest position R if the working position A was the starting position, or the working position A if the rest position R was the starting position—the drive for the planetary gear 130 is also switched off and the planetary gear 130 is rotated back into the starting position of FIG. 20 by the drive such that the ring gear 142 likewise returns to the starting position.

If the pivot bearing body 14 moves from the working position A to the rest position R or vice versa, the actuation body 52 of the rotation-blocking device 50 is fixed in its release position by the blocking faces 90 until release of blocking of the rotation-blocking body 52 in the release position, depending on the rotary position of the pivot bearing body 14, only once the working position A or the rest position R is reached—as described.

If the pivot bearing body 214 is now to be transferred to the respectively other position again, then once again the planetary gear 130 is driven, in the same direction of rotation, such that the ring gear 142 also rotates in the same direction of rotation again (FIG. 25).

Once blocking of the actuation body 52 in the working position A or the rest position R has been overridden, the actuation body 52 performs a rotary movement as a result of the action of the torsion spring 114, such that the actuation body 52, together with the drive sleeve 122, likewise begins to rotate in the direction of rotation 312, and rotates in relation to the ring gear 142 as a result of the fact that the drive fingers 158 are movable in relation to the drive slots 156—as illustrated in FIG. 25—such that the drive fingers 158a, 158b begin to move in the direction of rotation 312 relative to the drive slots 156a and 156b, in order then to arrive back in the rotary position illustrated in FIG. 20, in the working position.

Figure 18:
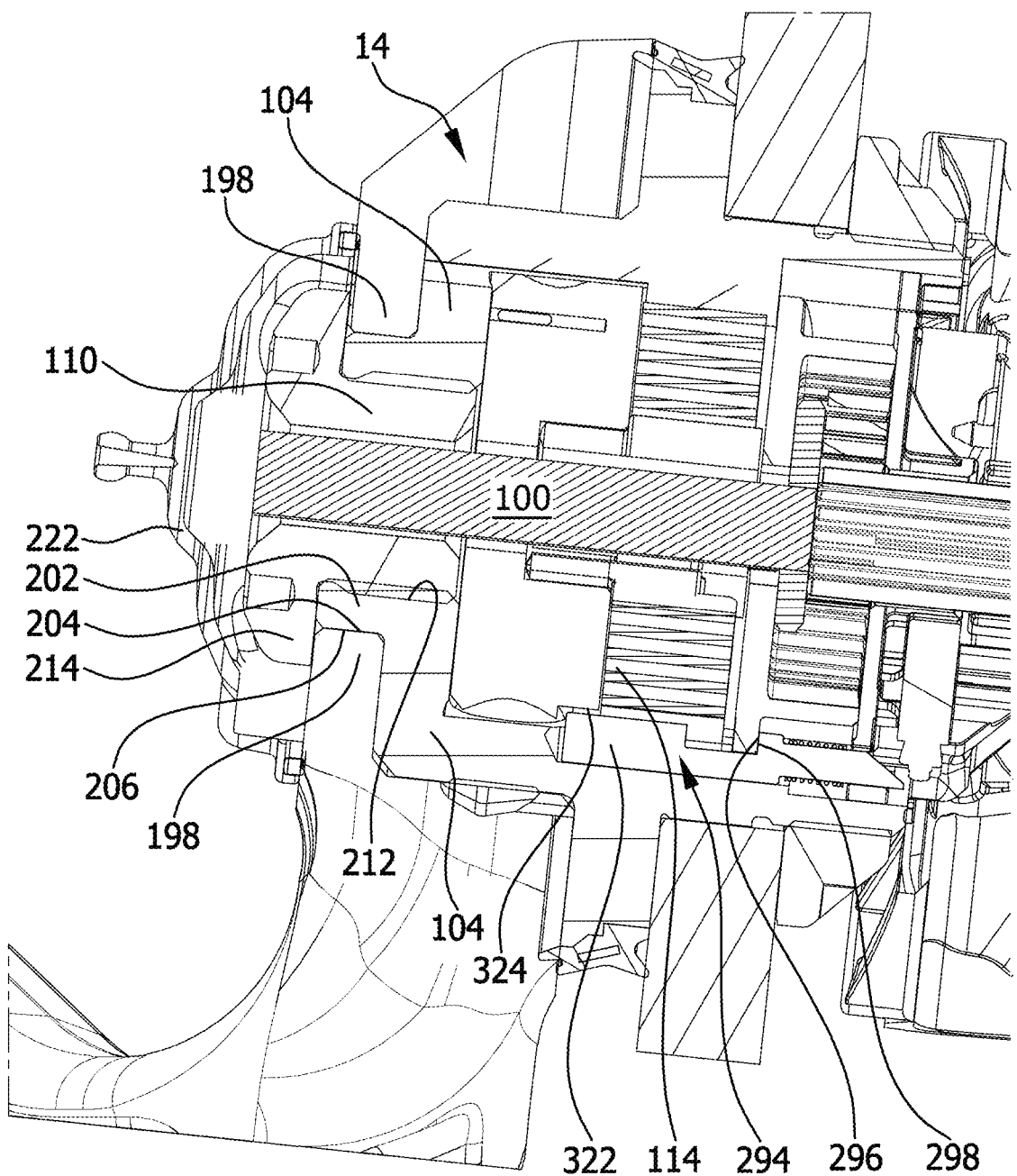
FIG. 18 shows an enlarged section from FIG. 6, in the working position.
Figure 19:
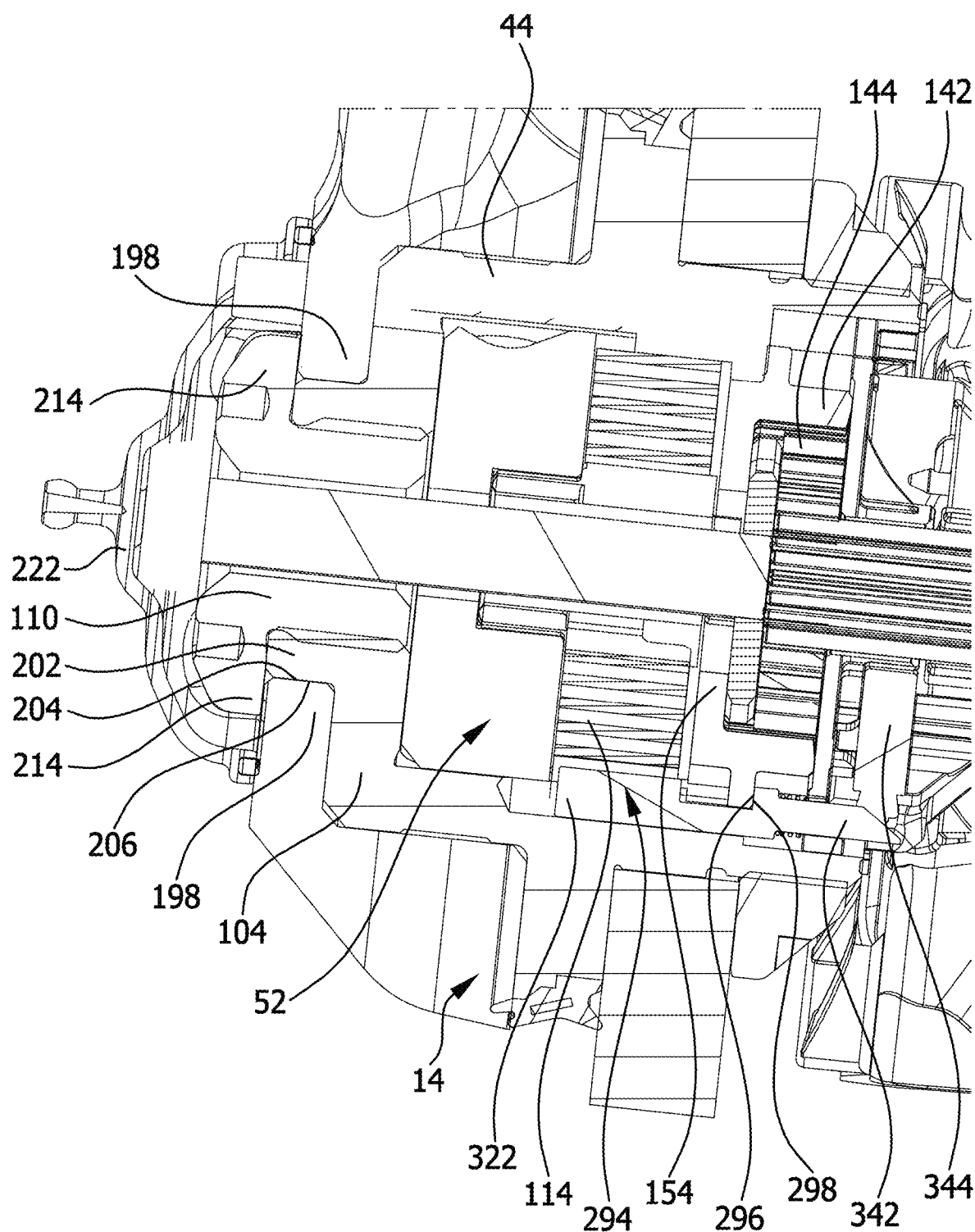
FIG. 19 shows an enlarged section, similar to FIG. 18, in the rest position.

As also illustrated in FIGS. 20 to 26, the cam flange 290 of the ring gear 142 carries a securing cam track 298 for actuating the securing pin 294, illustrated in FIGS. 18 and 19 and in FIGS. 20 to 26.

Here, the securing pin 294 has a securing body 322, which, for the purpose of securing the rotary position of the actuation body 52 in the rotation-blocking position, engages in a securing recess 324 that is formed such that the actuation body 52 is unable to come out of the rotation-blocking position, and thus the rotation-blocking position is secured in the working position—that is to say that locking of the pivot bearing body 214 in the working position is also secured.

The securing pin 294, which is movable by the securing cam track 298, forms, together with the securing body 322 and the securing recess 324, a securing device 330.

The securing cam track 298 is arranged on the cam flange 290 and is shaped such that, from the securing position of the securing pin 294 (FIG. 20), in which the securing body 322 engages in the securing recess 324, after the initial rotation of the ring gear 142 from the starting position in the direction of rotation 292, the securing cam track 298 already displaces the securing pin 294 far enough for the securing body 322 to come out of the securing recess 324 of the actuation body 52 (FIG. 21b) in order to enable the succeeding rotary movement of the actuation body 52.

For this purpose, the securing cam track 298 is provided with a securing region 332, which enables securing of the rotation-blocking position of the actuation body 52, and a non-securing region 334, which undoes securing of the movement of the rotation-blocking body 52, wherein these are connected to one another by a transfer region 336.

Moreover, the securing pin 294 is also provided with a prolonged portion 342, which depending on the position of the securing pin 294 actuates or does not actuate a sensing device 344, wherein for example the sensing device 344 is arranged such that in the unsecured position of the securing pin 294 it is actuated and in the securing position of the securing pin 294 it is not actuated, as can be seen from FIGS. 18 and 19.

The trailer hitch according to the invention operates as follows.

Starting from the working position, illustrated in FIGS. 1, 2, 3 and 6, and in FIG. 7, in which rotation of the pivot bearing body 14 relative to the guide body 40 is blocked in respect of a rotary movement about the pivot axis 22 by the rotation-blocking device 50, in particular because the actuation body 52 has moved the rotation-blocking bodies 54 in the guide direction 58 radially outward far enough away from the pivot axis 22 for them to engage in the working position receptacles 60A and hence to fix the pivot bearing body 14 such that rotation thereof relative to the guide body 40 is blocked, switching on of the drive unit 182 has the effect that the drive gearwheel is driven by the output gearwheel 174 such that the drive shaft 166 drives the sun wheel 162.

This, for its part, drives the planet wheels 146, wherein the planet carrier 152 is blocked in respect of a rotary movement about the pivot axis 22.

As a result, the ring gear 142 is driven such that it rotates in the direction of rotation 292, according to FIG. 20. Initially, this rotation of the ring gear 142 has the effect of actuating the securing device 320, wherein displacement of the securing pin 294 causes the securing body 322 to come out of the securing recess 324 of the actuation body 52 and to be transferred from the securing position into the unsecured position (FIG. 21). Further rotation of the ring gear 142 already results in rotation of the actuation body 52 of the rotation-blocking device 50.

Only then, as illustrated in FIGS. 23 to 24, is the drive sleeve 122, which is connected to the actuation body 52 by the prolonged portions 124 such that it cannot rotate in relation thereto, rotated by way of the drive slots 156 and the drive fingers 158.

As a result, the ring gear 142 rotates the actuation body 52 in the direction of its release position, far enough out of the rotation-blocking position for the release position to be reached.

Since, when the release position of the actuation body 52 is reached, rotary movement of the pivot bearing body 14 is possible and moreover the rotary movement of the actuation body 52 in the direction of rotation 72 is prevented by the action of the ring gear 142, the ring gear 142 of the planetary gear 130 stops. In this release position of the actuation body 52, the rotation-blocking bodies 54 are also in the release position, and consequently the pivot bearing body 14 can pivot, for example acted upon by the force of gravity or by a pivotal deflection spring (not illustrated), about the pivot axis 22 in the direction of the rest position R, wherein the ball neck stops, preferably in an intermediate position Z pointing in the direction of the road surface FO.

A manual action is envisaged for pivoting further in the direction of the rest position.

Once the working position has been left, the drive unit 182 is energized in the opposite direction of rotation such that it moves back into the starting position according to FIG. 20 again, in which the rotation-blocking device 50 is urged by the torsion spring 114.

When the rest position R is reached, the rotation-blocking device 50 is transferred from the release position into the rotation-blocking position as a result of the action of the torsion spring 114, wherein each of the rotation-blocking bodies 54 engages in one of the rest position receptacles 60R.

If the ball neck 10 is now to be pivoted back from the rest position R to the working position A, the drive unit 182 is operated in the direction of rotation that moves the actuation body 52 back into the release position.

When the working position A or the rest position R is reached, there is no blocking of the actuation body 52 for the purpose of moving in the direction of rotation 72 under the action of the torsion spring 114 in the direction of the rotation-blocking position, in the manner described and as illustrated for example in FIG. 20, wherein the rotation-blocking bodies 54 are pushed outward into the receptacles 60 by the actuation body 52, radially in relation to the pivot axis 22, and thus in turn result in a blocking of rotation of the pivot bearing body 14 in relation to the guide body 40 (FIG. 26).

In the position in which the pivot bearing body 14 is locked respectively in the working position A or the rest position R in relation to the guide body 40, the ring gear 142 is rotated into the starting position illustrated in FIG. 20, in which the actuation body 52 can perform a further rotary movement in the direction of rotation 72 under the action of the torsion spring 114, with the result that the ring gear 142 in the working position A does not impede later adjustment by rotating the actuation body 52 further in the direction of rotation 72 under the action of the torsion spring 114.

With the solution according to the invention, in particular for the purpose of releasing the rotation-blocking device 50 by means of a control unit 350, the step-down gear 130 and thus the ring gear 142 are driven by means of the drive unit 182 such that the actuation body 52 is moved from the rotation-blocking position into the release position by action on the actuation body 52 in opposition to the action of the force of the torsion spring 114.

Then, either on detection of the position of the pivot bearing body 14 by means of a sensor, for example a rotary position sensor 352, a test is performed of whether the pivot bearing body 14 has come out of the working position A or the rest position R, or else a defined time interval is allowed to elapse after the rotation-blocking body 52 has moved into the release position, detected for example by an increase in the motor current of the drive unit 182 and after the abutment element 295 has abutted against the securing pin 294, and then the drive unit 182 moves back into a starting position, for example as a result of the step-down gear 130 and thus the ring gear 142 rotating back into the starting position such that the torsion spring 114 urges the actuation body 52 by force, in each case before the rest position R or the working position A of the pivot bearing body 14 is reached, and consequently at least one of the rotation-blocking bodies 54 or, just before the rest position R or the working position A is reached, all the rotation-blocking bodies 54 abut against the blocking faces 90 in order then, when the rest position R or the working position A is reached, to slide over the opening edges 92 of the working position receptacles 60A or the rest position receptacles 60R and into these and to be transferred into the rotation-blocking position.

Further, once the actuation body 52 has been transferred into the rotation-blocking position, the securing device 330 becomes active, with the result that the securing pin 294 engages by means of the securing body 322 in the securing recess 324 of the actuation body 52 and prevents it from being transferred into the release position.

The invention claimed is:

1. A trailer hitch, comprising a ball neck, which is movable between a working position and a rest position and has a pivot bearing body arranged at a first end and a coupling ball arranged at a second end, a pivot bearing unit, which is arranged fixed to a vehicle and by means of which the pivot bearing body is received such that it is pivotal for the purpose of performing a pivotal movement about a pivot axis between the working position and the rest position, and a rotation-blocking device that is active between the pivot bearing unit and the pivot bearing body and has on the one hand at least two rotation-blocking units, each of which has a rotation-blocking body that is guided in a manner movable in a guide direction by means of a guide receptacle in a guide body and is movable in the guide direction by a pressure face provided on an actuation body and running transversely to the guide direction, and on the other hand has at least two working position receptacles and at least two rest position receptacles, wherein a movement of the actuation body in an actuation direction makes the rotation-blocking bodies of all the rotation-blocking units movable and urgeable in the guide direction, and wherein, in the working position or the rest position, the rotation-blocking bodies of all the rotation-blocking units are configured to be brought into a rotation-blocking position by movement in the guide direction, and in this position each rotation-blocking body comes into engagement with a respective one of the working position receptacles or the rest position receptacles in order to block a pivotal movement of the pivot bearing body about the pivot axis in relation to the guide body, and wherein the rotation-blocking bodies are configured to be brought into a release position, and in this position are disengaged from the respective working position receptacle or the respective rest position receptacle and enable the pivotal movement of the pivot bearing body, blocking faces run between the working position receptacles and the rest position receptacles against which the rotation-blocking bodies are configured to abut and from which the working position receptacles and the rest position receptacles extend, the rotation-blocking units and the working position receptacles and the rest position receptacles are arranged at angular spacings from one another around the pivot axis such that, in all the pivotal positions of the pivot bearing body that are provided, with the exception of the working position and the rest position, the rotation-blocking body of at least one of the rotation-blocking units lies opposite one of the blocking faces, and thus, in particular if there is a force urging the actuation body in the direction of the actuation direction, this blocking face blocks movement of the actuation body in the actuation direction and consequently also blocks engagement, urged by force, of the rotation-blocking bodies of each of the rotation-blocking units in one of the working position receptacles or rest position receptacles.

2. The trailer hitch as claimed in claim 1, wherein the blocking faces run facing the rotation-blocking bodies of the rotation-blocking units.

3. The trailer hitch as claimed in claim 1, wherein the blocking faces run around the pivot axis at a defined radius.

4. The trailer hitch as claimed in claim 1, wherein the blocking faces run as far as opening edges of the working position receptacles and the rest position receptacles and undergo a transition into these.

5. The trailer hitch as claimed in claim 4, wherein the opening edges of the working position receptacles and the rest position receptacles are located at the same radial spacing from the pivot axis as the blocking faces.

6. The trailer hitch as claimed in claim 1, wherein, in the event of a pivotal movement of the pivot bearing body (14) in the direction of the working position (A), at least one of the rotation-blocking bodies (54) of the rotation-blocking units (80) abuts against one of the blocking faces (90), in particular abutting in a manner urged by force by the action of the actuation body (52).

7. The trailer hitch as claimed in claim 1, wherein, before reaching the working position, the rotation-blocking bodies abut against the blocking faces in a manner urged by force and then enter the working position receptacles such that they abut against opening edges of the working position receptacles in a manner urged by force.

8. The trailer hitch as claimed in claim 1, wherein the working position receptacles extend in the guide direction from the blocking faces, in particular with at least one component in the radial direction relative to the pivot axis.

9. The trailer hitch as claimed in claim 1, wherein, in the event of a pivotal movement of the pivot bearing body in the direction of the rest position, at least one of the rotation-blocking bodies of the rotation-blocking units abuts against one of the blocking faces, in particular abutting in a manner urged by force by the action of the actuation body.

10. The trailer hitch as claimed in claim 1, wherein, before reaching the rest position, the rotation-blocking bodies abut against the blocking faces in a manner urged by force and then enter the rest position receptacles such that they abut against opening edges of the rest position receptacles in a manner urged by force.

11. The trailer hitch as claimed in claim 1, wherein the rest position receptacles extend in the guide direction from the blocking faces, in particular with at least one component in the radial direction relative to the pivot axis.

12. The trailer hitch as claimed in claim 1, wherein the guide body has a guide sleeve, and wherein the working position receptacles, the rest position receptacles and the blocking faces are arranged facing the guide sleeve.

13. The trailer hitch as claimed in claim 1, wherein the guide body is part of the pivot bearing unit arranged fixed to the vehicle.

14. The trailer hitch as claimed in claim 1, wherein all the guide receptacles for the rotation-blocking bodies of the rotation-blocking units are arranged in the guide body.

15. The trailer hitch as claimed in claim 1, wherein at least one component of the guide direction runs in the radial direction in relation to the pivot axis.

16. The trailer hitch as claimed in claim 1, wherein the guide body has a guide sleeve with guide receptacles for the rotation-blocking bodies of the rotation-blocking units, and wherein in particular the rotation-blocking bodies are guided by the guide body adjoining the pivot bearing body in the radial direction.

17. The trailer hitch as claimed in claim 1, wherein the guide body has a pivot bearing for the pivot bearing body.

18. The trailer hitch as claimed in claim 1, wherein the actuation body is guided such that it is movable in relation to the guide body.

19. The trailer hitch as claimed in claim 1, wherein the actuation body is arranged such that it is rotatable about the pivot axis and in particular has wedge faces extending over an angular range around the pivot axis and varying in the direction parallel to the guide direction, preferably combined with retraction receptacles.

20. The trailer hitch as claimed in claim 1, wherein the receptacles and the blocking faces are arranged on the pivot bearing body.

21. The trailer hitch as claimed in claim 1, wherein the actuation body is surrounded by the guide body, and wherein in particular the pivot bearing body embraces the guide body.

22. The trailer hitch as claimed in claim 1, wherein the rotation-blocking bodies are arranged around the actuation body.

23. The trailer hitch as claimed in claim 1, wherein the pivot bearing body forms an outer body outwardly surrounding the pivot bearing unit, wherein the outer body is arranged to be non-displaceable in the direction of the pivot axis in relation to the pivot bearing unit, and wherein in particular the pivot bearing body forms an outer body that outwardly surrounds at least one section of the rotation-blocking unit and that is arranged to be non-displaceable in the direction of the pivot axis in relation to the guide body.

24. The trailer hitch as claimed in claim 1, wherein the actuation body is urged in the direction of its rotation-blocking position by a resilient energy store.

25. The trailer hitch as claimed in claim 1, wherein the actuation body is movable from the rotation-blocking position into the release position by an actuation device.

26. The trailer hitch as claimed in claim 24, wherein the actuation body is movable by the actuation device in opposition to urging by the energy store.

27. The trailer hitch as claimed in claim 24, wherein, as a result of the actuation device, the actuation body is rotatable in opposition to the actuation direction brought about by the resilient energy store.

28. The trailer hitch as claimed in claim 1, wherein the actuation device has an output element that is coupled to the actuation body.

29. The trailer hitch as claimed in claim 28, wherein the output element and the actuation body are coupled to one another by way of an entraining coupling device.

30. The trailer hitch as claimed in claim 29, wherein the entraining coupling device has a free condition, with no entrainment, and an entraining condition.

31. The trailer hitch as claimed in claim 1, wherein the actuation device for the rotation-blocking device comprises a motorized drive unit.

32. The trailer hitch as claimed in claim 1, wherein an output element of a step-down gear for driving the rotation-blocking device is provided.

33. The trailer hitch as claimed in claim 32, wherein the step-down gear is driven by a motorized drive unit and in particular takes the form of an epicyclic gear.

34. The trailer hitch as claimed in claim 32, wherein the actuation device for the rotation-blocking device comprises a motorized drive unit, and wherein the step-down gear is arranged on a side of the actuation element that faces the motorized drive unit.

35. The trailer hitch as claimed in claim 31, wherein, as seen in the direction of the pivot axis, the step-down gear is driven on one side by the motorized drive unit and has an output drive for the actuation element on the opposite side.

36. The trailer hitch as claimed in claim 31, wherein the step-down gear is arranged, as seen in the direction of the pivot axis, between the motorized drive unit and the actuation element.

37. The trailer hitch as claimed in claim 31, wherein the step-down gear, the resilient energy store and the actuation element are arranged such that they succeed one another in the direction of the pivot axis.

38. The trailer hitch as claimed in claim 1, wherein the actuation body is blockable in its rotation-blocking position by a securing device.

39. The trailer hitch as claimed in claim 38, wherein the actuation body is blockable by the securing device to prevent its reaching its release position.

40. The trailer hitch as claims in claim 1, wherein the rotation-blocking units for forming a rotation-blocking configuration are arranged at angular spacings around the pivot axis, the working position receptacles and the rest position receptacles for forming a respective receptacle configuration for the working position and the rest position are arranged at the same angular spacings around the pivot axis as the rotation-blocking units, the rotation-blocking configuration and the receptacle configuration of the working position receptacle in the working position or the rest position receptacles in the rest position are mutually congruent such that the rotation-blocking bodies can engage in the working position receptacles or the rest position receptacles, and the angular spacings between the rotation-blocking units of the rotation-blocking configuration and the angular spacings between the working position receptacles and the rest position receptacles of the receptacle configurations are selected such that the rotation-blocking configuration and one of the receptacle configurations are only mutually congruent in the working position or the rest position.

41. The trailer hitch as claims in claim 1, wherein the angular spacings of at least one of the rotation-blocking units in relation to the rotation-blocking units arranged in a direction of revolution around the pivot axis and in relation to the rotation-blocking units arranged adjacent and in opposition to this direction of revolution are dissimilar, in the working position the working position receptacles are arranged such that the rotation-blocking body of each of the rotation-blocking units is configured to be brought into engagement with a respective one of the working position receptacles, in the rest position the rest position receptacles are arranged such that the rotation-blocking body of each of the rotation-blocking units is configured to be brought into engagement with a respective one of the rest position receptacles, and, in all the pivotal positions of the pivot bearing body that are provided for operation and are outside the working position and the rest position, the rotation-blocking body of at least one of the rotation-blocking units lies opposite a blocking face running between the working position receptacles and the rest position receptacles, and, in particular if there is a force acting on the actuation body, the blocking face blocks movement of the actuation body from the release position into the rotation-blocking position.

* * * * *